US012632510B2

(12) United States Patent
Özer et al.

(10) Patent No.: US 12,632,510 B2
(45) Date of Patent: May 19, 2026

(54) APPROXIMATE QUANTILE ESTIMATION

(71) Applicant: Arm Limited, Cambridge (GB)

(72) Inventors: Emre Özer, Buckden (GB); Sahan Sajeewa Hiniduma Udugama Gamage, Cambridge (GB); Mbou Eyole, Soham (GB); Fernando Garcia Redondo, Cambridge (GB); Jedrzej Kufel, Soham (GB); John Philip Biggs, Cambridge (GB)

(73) Assignee: Arm Limited, Cambridge (GB)

( * ) Notice: Subject to any disclaimer, the term of this patent is extended or adjusted under 35 U.S.C. 154(b) by 664 days.

(21) Appl. No.: 18/074,636

(22) Filed: Dec. 5, 2022

(65) Prior Publication Data

US 2024/0184849 A1 Jun. 6, 2024

(51) Int. Cl.
*G06F 17/18* (2006.01)

(52) U.S. Cl.
CPC .................................. *G06F 17/18* (2013.01)

(58) Field of Classification Search
CPC ...................................................... G06F 17/18
See application file for complete search history.

(56) References Cited

U.S. PATENT DOCUMENTS

| | | | | |
|---|---|---|---|---|
| 6,434,570 B1 * | 8/2002 | Rangan | .................... | G06F 17/18 706/56 |
| 2008/0140347 A1 * | 6/2008 | Ramsey | ................. | G06Q 10/00 702/180 |
| 2010/0279622 A1 * | 11/2010 | Shuman | ................. | H04W 24/08 455/67.11 |
| 2010/0292995 A1 * | 11/2010 | Bu | .......................... | G06Q 30/02 705/1.1 |
| 2011/0093477 A1 * | 4/2011 | Aldridge | ................. | G06F 17/18 703/2 |
| 2019/0129919 A1 * | 5/2019 | Wu | .......................... | G06F 17/18 |
| 2021/0142474 A1 * | 5/2021 | Nakatomi | ............. | G06T 7/0012 |

OTHER PUBLICATIONS

Khan et al., "Real-Time Quantile-Based Estimation of Resource Utilization on an FPGA Platform Using HLS" IEEE Access vol. 8, 2020 (Year: 2020).*

Gari D. Clifford et al., "AF Classification from a Short Single Lead ECG Recording: the PhysioNet/Computing in Cardiology Challenge 2017", 2017, 4 pages.

(Continued)

*Primary Examiner* — John C Kuan

(74) *Attorney, Agent, or Firm* — NIXON & VANDERHYE P.C.

(57) ABSTRACT

Apparatuses, corresponding methods, and instructions for data processing for the generation of an approximate quantile are provided. A sequence of data values is received, wherein the data values span a range of values and in a plurality of counters each counter is configured to have a correspondence to a subrange within the range of values. For each data value received a corresponding counter of the plurality of counters is determined and an update is applied to the corresponding counter of the plurality of counters. Approximate quantile determination is performed to generate at least one approximate quantile value for the sequence of data values received in dependence on respective counts of the plurality of counters.

16 Claims, 17 Drawing Sheets

(56) References Cited

OTHER PUBLICATIONS

Gurmeet Singh Manku et al., "Approximate Medians and other Quantiles in One Pass and with Limited Memory", IBM Almaden Research Center, 1998, 10 pages.

S. Battiato et al., "An Efficient Algorithm for the Approximate Median Selection Problem", Sicilian Median Selection, Oct. 28, 2022, 25 pages.

Suhaib A. Fahmy, "Histogram-Based Probability Density Function Estimation on FPGAs", School of Computer Nanyang Technological University, IEEE, 2010, 5 pages.

Jukka Suomela, "Median Filtering is Equivalent to Sorting", Helsinki Institute for Information Technology HIIT, Department of Information and Computer Science, Jun. 6, 2014, 25 pages.

Raj Jain et al., "The $P^2$ Algorithm for Dynamic Calculation of Quantiles and Histograms Without Storing Observations", Communications of the ACM, Oct. 1985, 10 pages.

* cited by examiner

ECG Signal

R peak

Rpeak Intervals

120

Sensor
121

Sensor
Interface
122

Feature
Extraction
Unit
123

Features

ML HW
124

Prediction

Fulcrum point of view of the median

Uniform density assumption

Move to lower as L>M+H (after window of updates)

Move to upper as H>M+L (after window of updates)

APPROXIMATE QUANTILE ESTIMATION

TECHNICAL FIELD

The present disclosure relates to data processing. In particular, the present disclosure relates to techniques for estimating quantile values of a sequence of data values.

DESCRIPTION

A data processing apparatus which handles a sequence of data values may be required to make use of a quantile value (e.g. the median value) determined for the set of data values observed in that sequence. Whilst mathematically speaking the determination of an exact quantile value is well-known and can for example be carried out by arranging the set of data values in order (e.g. ascending) and then identifying, for example, a mid-point to find the median. However, such techniques assume that the data values can all be held simultaneously in memory and, depending on the hardware configuration of the apparatus, this may not be the case. For example, for some forms of electronics, such as those found in the printed/flexible electronics arena, memory storage can be extremely limited. Such constraints can bring the need to process the sequence of data values on the fly without storing them all as a whole. Accordingly, there exists the need for techniques to estimate quantile values of a sequence of data values without the full sequence of data values being simultaneously available in stored memory.

SUMMARY

In one example embodiment described herein there is an apparatus comprising:

input circuitry arranged to receive a sequence of data values, wherein the data values span a range of values;

a plurality of counters, wherein each counter of the plurality of counters is configured to have a correspondence to a subrange within the range of values;

data counter correspondence circuitry arranged to determine for each data value received by the input circuitry a corresponding counter of the plurality of counters and to apply an update to the corresponding counter of the plurality of counters; and approximate quantile determination circuitry arranged to generate at least one approximate quantile value for the sequence of data values received in dependence on respective counts of the plurality of counters.

In one example embodiment described herein there is a method of operating an approximate quantile determination apparatus comprising:

receiving a sequence of data values, wherein the data values span a range of values;

assigning each counter of a plurality of counters to have a correspondence to a subrange within the range of values;

determining for each data value received by the input circuitry a corresponding counter of the plurality of counters;

applying an update to the corresponding counter of the plurality of counters; and generating at least one approximate quantile value for the sequence of data values received in dependence on respective counts of the plurality of counters.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
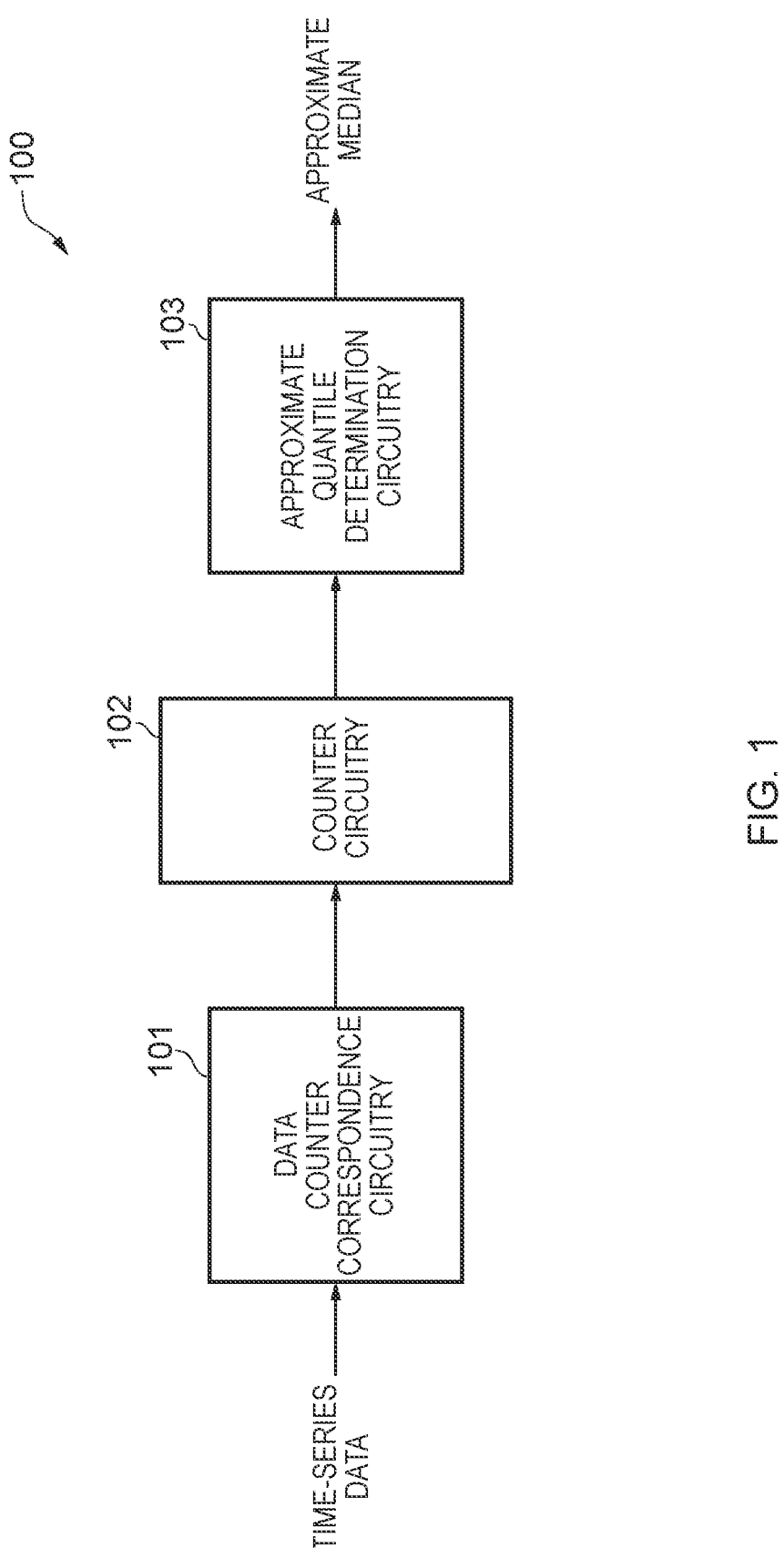
FIG. 1 schematically illustrates an apparatus for approximate quantile determination in accordance with some examples.

Before discussing the embodiments with reference to the accompanying figures, the following description of embodiments is provided.

In accordance with one example configuration there is provided an apparatus comprising:

input circuitry arranged to receive a sequence of data values, wherein the data values span a range of values;

a plurality of counters, wherein each counter of the plurality of counters is configured to have a correspondence to a subrange within the range of values;

data counter correspondence circuitry arranged to determine for each data value received by the input circuitry a corresponding counter of the plurality of counters and to apply an update to the corresponding counter of the plurality of counters; and approximate quantile determination circuitry arranged to generate at least one approximate quantile value for the sequence of data values received in dependence on respective counts of the plurality of counters.

The present techniques make use of a set of counters and updates (e.g. increments) a selected one of the set of counters for each data value received within a range of values. A correspondence between the values which lie in the range of values and the respective counters of the set of counters is defined and the data counter correspondence circuitry causes the appropriate counter to be updated for each data value processed. An approximate quantile value for the sequence of data values (e.g. the first quartile, the second quartile (median), or the third quartile) can then be generated in dependence on respective counts of the plurality of counters. The determination of the approximate quantile value can happen at any time, although an improved estimation is achieved when sufficient data values have been observed and sufficient corresponding counts have been built up. Conversely it is to be expected that the counters will have a finite capacity and will eventually run out of count space. As such an initial "data population" mode of operation should be carried out for long enough to result in a useful accumulation of counts in the counters. Thereafter a subsequent "quantile estimation" mode of operation can be triggered to determine the estimated quantile value(s) required on the basis of the accumulated counts.

In some examples the apparatus is configured to operate initially in a data population mode and subsequently in a quantile estimation mode, wherein the apparatus is configured to switch from the data population mode to the quantile estimation mode in response to count saturation of a threshold number of the plurality of counters. The count saturation of the counters can therefore be employed as a trigger for the determination of the estimated quantile(s).

In order to estimate the quantile(s) required, the counts of all of the plurality of counters could be considered and taken into account. However, in some examples the apparatus further comprises start index tracking circuitry configured to maintain an indication of a lowest subrange non-zero counter of the plurality of counters. This enables a more efficient determination to be performed, only taking into account the counts starting with the lowest subrange non-zero counter.

The approximate quantile determination circuitry may take a variety of forms, but in some examples the apparatus further comprises:

data value count circuitry configured to count a total number of data values received by the input circuitry;

quantile threshold circuitry configured to generate at least one quantile count threshold value derived from the total number of data values;

quantile index generation circuitry configured to generate at least one index into the plurality of counters corresponding to the at least one quantile count threshold value; and quantile generation circuitry configured to generate the at least one approximate quantile value in dependence on the at least one index into the plurality of counters.

The counters may be variously configured, in particular each counter of the plurality of counters may take various forms. In some examples, the plurality of counters comprises a set of multi-state counters, wherein each counter is configured to indicate one of more than two possible states. In some examples the plurality of counters comprises a bit vector configured to maintain one of two possible states per counter. The development of the present techniques has surprisingly revealed that although of course a more accurate approximate quantile value can be generated when the plurality of counters comprises multi-state counters, in some contexts even configurations which only to maintain one of two possible states per counter (e.g. a binary value) can lead to a useful approximate quantile value being generated. Moreover, in cases where the counters are limited to only maintaining one of two possible states, the plurality of counters can be provided in a very modest amount of hardware.

In some examples the apparatus further comprises edge index tracking circuitry configured to maintain indications of a lowest subrange non-zero counter of the plurality of counters and of a highest subrange non-zero counter of the plurality of counters. In particular, in the case of the bit vector plurality of counters, these indications of the lowest and highest non-zero counter allow a fast determination of the subranges (i.e. bits of the bit vector) which correspond to the outer limits of the range of data values observed and thereby a fast determination of estimated quantile(s).

Hence in some examples the approximate quantile determination circuitry is configured to generate the at last one approximate quantile value in dependence on a difference between the indication of the lowest subrange non-zero counter and the indication of the highest subrange non-zero counter.

A further observation resulting from the development of the present techniques is that the skewedness of the data set can have a significant bearing on how accurate the estimated quantile(s) turn out to be depending on the particular technique used to determine them. For example, it has been found that the bit vector configuration of the counters can provide an adequate estimated quantile in various contexts, but that the accuracy of the estimate deteriorates for skewed data sets. Accordingly, it can be useful to determine the degree of skewedness of a data set and hence in some examples the apparatus further comprises data skewedness determination circuitry configured to compare accumulated counts for a first subset of the plurality of counters and a second subset of the plurality of counters, and to determine a skewedness of the sequence of data values by comparison of the first subset and the second subset.

This determination of skewedness of the sequence of data values can then be used in various ways, in some cases only passively to give an indication of that skewedness to the user and/or an indication of confidence (or not) in the accuracy of the estimated quantile. However, in other cases more active control of the apparatus can be based on that determination of skewedness. In some examples the apparatus comprises:

a first sub-apparatus comprising the plurality of counters, the data counter correspondence circuitry, and the approximate quantile determination circuitry; and a second sub-apparatus comprising a further plurality of counters, further data counter correspondence circuitry, and further approximate quantile determination circuitry, wherein when the skewedness does not meet a skewedness threshold the apparatus is configured to use the first sub-apparatus to generate the at least one approximate quantile value, and when the skewedness meets the skewedness threshold the apparatus is configured to use the second sub-apparatus to generate the at least one approximate quantile value.

Various possible configurations of the apparatus may have a range of operating speeds, which is to say that some configurations may be capable of generating an approximate quantile value faster than others. Typically, such faster output may also be associated with a generally lower accuracy for the approximate quantile values generated. Thus there may be a trade-off in the chosen configuration between speed of estimate generation and accuracy of estimate. Nevertheless, this may not be a binary choice for a given implementation of the present techniques, in that for example two types of approximate quantile value estimation circuitry may be provided, operating in coordination with one another. For example, a faster, less accurate set of circuitry might be enabled in an early phase of operation, in order to give a quicker indication of an approximate value, with a slower, more accurate set of circuitry enabled in a later phase of operation. Indeed, the output of the earlier phase may be employed to inform the configuration of the later phase, such that the fast, early estimate of the approximate quantile value(s) can be used to calibrate the slower, more accurate circuitry (such as in terms of what binning to apply to the data, i.e. the correspondence between counters and data values).

In some examples the apparatus is provided, wherein the plurality of counters comprise a set of registers configured to capture a distribution of values, wherein the data counter correspondence circuitry is arranged to perform a scaling and shifting for each data value received by the input circuitry and to apply parallel updates to the set of registers; and wherein the approximate quantile determination circuitry is configured to perform comparisons of accumulated histograms in the set of registers with a pre-defined dataset quantile point and to generate the at least one approximate quantile value for the sequence of data values by a priority encoder selection from the output of the comparisons. The parallelisation of the updates to the set of registers and the determination of the at least one approximate quantile value via the pre-defined dataset quantile point comparison and priority encoder selection mechanism provides a particularly fast mechanism for the estimate generation. In view of the above discussion, although a fast mechanism such as this may have a commensurately lower accuracy for the estimate, such an embodiment may nevertheless either find use in contexts where speed is significantly the most important factor. Alternatively, it may find use in combination with other slower, but more accurate embodiments disclosed herein as an example of a fast, early estimate generation technique, which can be used to select or inform a subsequent slower, more accurate technique.

In some examples the apparatus comprises:

a first sub-apparatus comprising the plurality of counters, the data counter correspondence circuitry, and the approximate quantile determination circuitry; and a second sub-apparatus comprising a further plurality of counters, further data counter correspondence circuitry, and further approximate quantile determination circuitry, wherein the apparatus is configured to operate initially in a data assessment mode and subsequently in a data measurement mode, wherein when in the data assessment mode the apparatus is configured to use the first sub-apparatus to determine an initial estimate of the range of values, and when in the data measurement mode the apparatus is configured to calibrate the second sub-apparatus using the initial estimate of the range of values and to use the second sub-apparatus to generate the at least one approximate quantile value.

The present techniques also propose further variants of configuration and accordingly in some examples the apparatus is provided, wherein the plurality of counters comprises a lower counter, a middle counter and, an upper counter, wherein the data counter correspondence circuitry is arranged:

for data values received by the input circuitry which are less than a provisional median value to apply the update to the lower counter;

for data values received by the input circuitry which are equal to the provisional median value to apply the update to the middle counter; and for data values received by the input circuitry which are greater than the provisional median value to apply the update to the upper counter, and wherein the approximate quantile determination circuitry arranged to generate the at least one approximate quantile value based on the provisional median value, wherein when a defined number of data values has been received by the input circuitry the approximate quantile determination circuitry is arranged to:

decrement the provisional median value when the lower counter exceeds a sum of the middle counter and the upper counter; and increment the provisional median value when the upper counter exceeds a sum of the middle counter and the lower counter.

This technique is sometimes referred to as the "fulcrum-based" approach herein and uses a current estimate "provisional" value of the median together with three counters (lower, middle, and upper) which are used to count corresponding entries relative to the provisional median value. Although discussed in terms of the median here, the concept is readily extended to estimate the first and third quartiles too. Starting from an initial (guessed or random) initial median value, as data values are received the low and high counters keep track of the number of lower and higher values than the median point. Based on the status of these three counters, the median point is moved upwards or downwards by a constant offset. Thus, where the lower counter has value L, the middle counter has value M and the higher counter has value H, for each data value d received one of the counters is incremented according to the current assumption of the median value: L is incremented if d<m, H is incremented if d>m, and M is incremented if d=m. After a defined number of data values has been received by the input circuitry, the provisional median value is shifted (to "balance the fulcrum"), whereby the provisional median value is lowered (e.g. decremented) when the lower counter exceeds a sum of the middle counter and the upper counter, and the provisional median value is raised (e.g. incremented) when the upper counter exceeds a sum of the middle counter and the lower counter.

The present disclosure further envisage that the techniques presented herein can also be invoked in a data processing apparatus by means of a dedicated instruction and accordingly in some examples the apparatus further comprises:

instruction decoding circuitry to decode a quantile estimation instruction, wherein the quantile estimation instruction specifies:

a range minimum and a range maximum which define the range of values;

a quantile estimation type which defines a configuration of the plurality of counters; and a destination register into which the at least one approximate quantile value is to be stored, where the instruction decoding circuitry is responsive to decoding the quantile estimation instruction to generate control signals to cause:

the plurality of counters to be configured in accordance with the quantile estimation type;

the data counter correspondence circuitry to determine for each data value received by the input circuitry the corresponding counter of the plurality of counters in dependence on the range minimum and the range maximum; and the approximate quantile determination circuitry to store the at least one approximate quantile value for the sequence of data values received in the destination register.

In some examples, when the quantile estimation type has a first value the control signals are configured to cause the plurality of counters to comprise a set of multi-bit counters and when the quantile estimation type has a second value the control signals are configured to cause the plurality of counters to comprise a bit vector comprising a single bit per counter. Accordingly, the instruction can readily switch between invoking the two configurations.

In some examples the quantile estimation instruction further specifies an offset to be used by the approximate quantile determination circuitry when decrementing or incrementing a provisional median value when generating the at least one approximate quantile value. This enables the offset to be easily set.

In accordance with one example configuration there is provided a method of operating an approximate quantile determination apparatus comprising:

receiving a sequence of data values, wherein the data values span a range of values;

assigning each counter of a plurality of counters to have a correspondence to a subrange within the range of values;

determining for each data value received by the input circuitry a corresponding counter of the plurality of counters;

applying an update to the corresponding counter of the plurality of counters; and generating at least one approximate quantile value for the sequence of data values received in dependence on respective counts of the plurality of counters.

Particular embodiments will now be described with reference to the figures.

FIG. 1 illustrates a data processing apparatus 100 in accordance with one embodiment. The apparatus comprises data counter correspondence circuitry 101, which receives time-series data, i.e. a sequence of data values in succession and determines for each data value received which of the plurality of counters which make up the counter circuitry 102 should be incremented. A first "data population" mode of the apparatus comprises a sequence of data values being received and the corresponding counter is incremented. Thereafter in a "quantile estimation" mode the approximate quantile determination circuitry 103 determines at least one approximate quantile value for the sequence of data values received based on the respective counts of the plurality of counters.

Figures 2A, 2B:
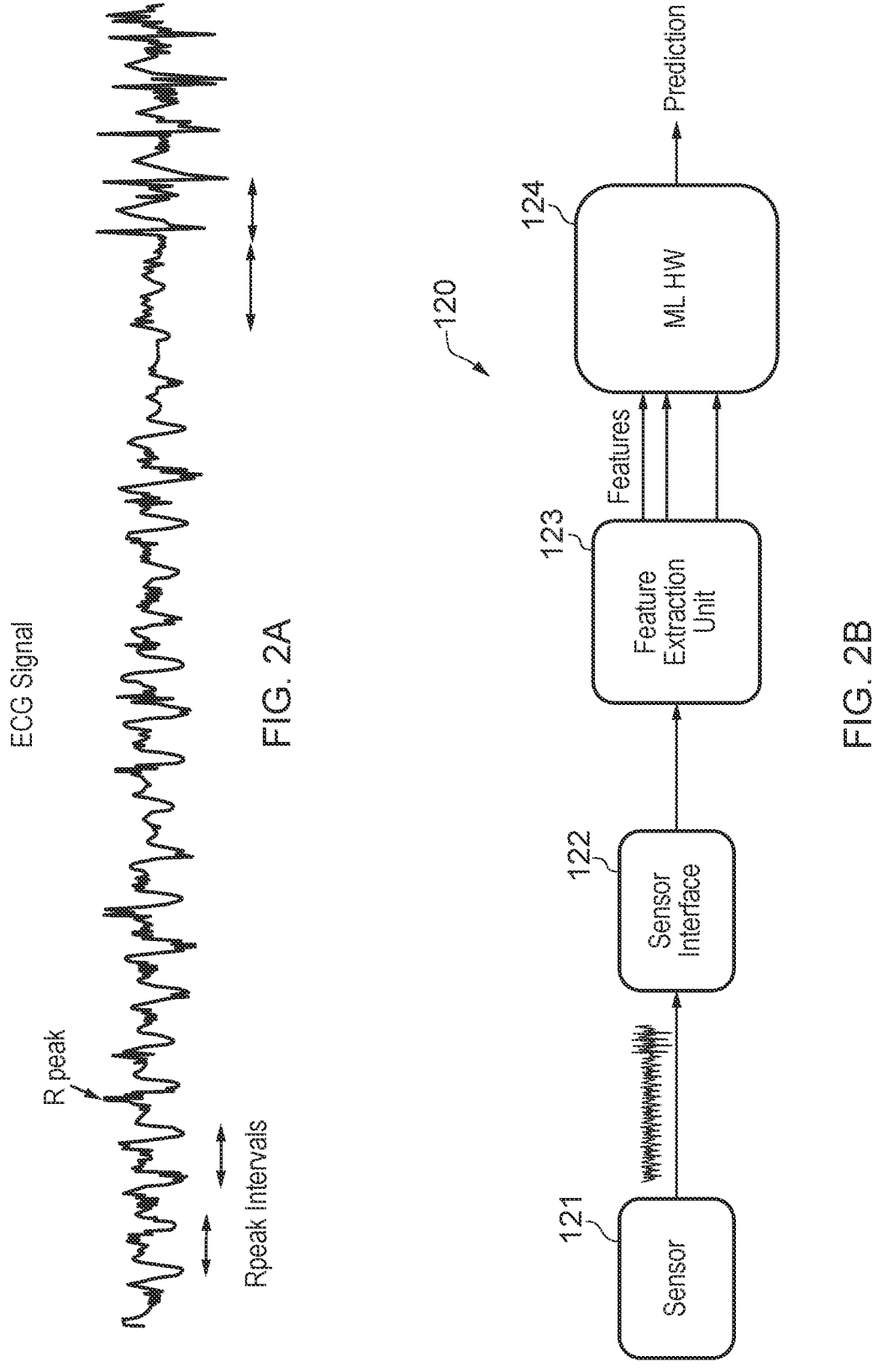
FIG. 2A shows an example ECG signal which be an example of a sensor signal which provide a sequence of data values for which approximate quantile determination is to be carried out in accordance with some examples.
FIG. 2B schematically illustrates an example of a smart sensor system in which the present techniques may be embodied in accordance with some examples.

The counter-based approach of the present techniques may find applicability in a wide range of contexts, but in view of the limited data storage capacity required to implement them, they may be of particular use in the printed/flexible electronics arena, in which memory storage can be extremely limited. Printed/flexible electronics are nowadays deployed ever more frequently in wearable electronic devices, some of which may have medical applications. For example, wearable electronic devices may be employed to monitor a range of physical parameters of the wearer. To take just one example, a wearable device may be configured to perform electrocardiography and record (at least features of) the user's heart's electrical activity. FIG. 2A shows an example ECG signal. Indicated on the figure is an example of one of the R peaks (essentially the primary maximum amplitudes of the ECG), as well as example R peak intervals. Various extracted features from such a trace might be monitored for a range of purposed, but monitored ECG data can be used to derive statistical properties of the data such as the mode, the mean, the median, the auto-correlation and so on. The median can be important, in particular, for predicting atrial fibrillation (AF) events in ECG data. For example, the median can be used as a feature extracted from an ECG signal that is fed as an input to predictive ML (machine learning) algorithms in order to predict AF. FIG. 2B schematically illustrates an example configuration of the components of such a lightweight ML system 120. A sensor 121 monitors the electrical activity of a heart, providing a sensor output which may broadly correspond to the ECG trace shown in FIG. 2A. This signal is passed via a sensor interface 122 to a feature extraction unit 123, configured to derive certain characteristic features from the signal. For example, firstly the R peaks themselves may be detected and a feature such as the R peak timing or R peak interval period may be derived, but further statistical properties of a sequence of such events may also be determined by the feature extraction unit 123, such as the median of the R peak intervals. Thus the present techniques may be implemented in components such as the feature extraction unit 123. Derived features then form the input to machine learning hardware (ML HW) 124, which is configured to implement an ML algorithm in order to make predictions, such as an increased likelihood of AF in the present context. The wearable system 120 can be provided with further components (e.g. a display or a communications interface to a smart watch) via which this prediction can be communicated to the user.

Figure 3:
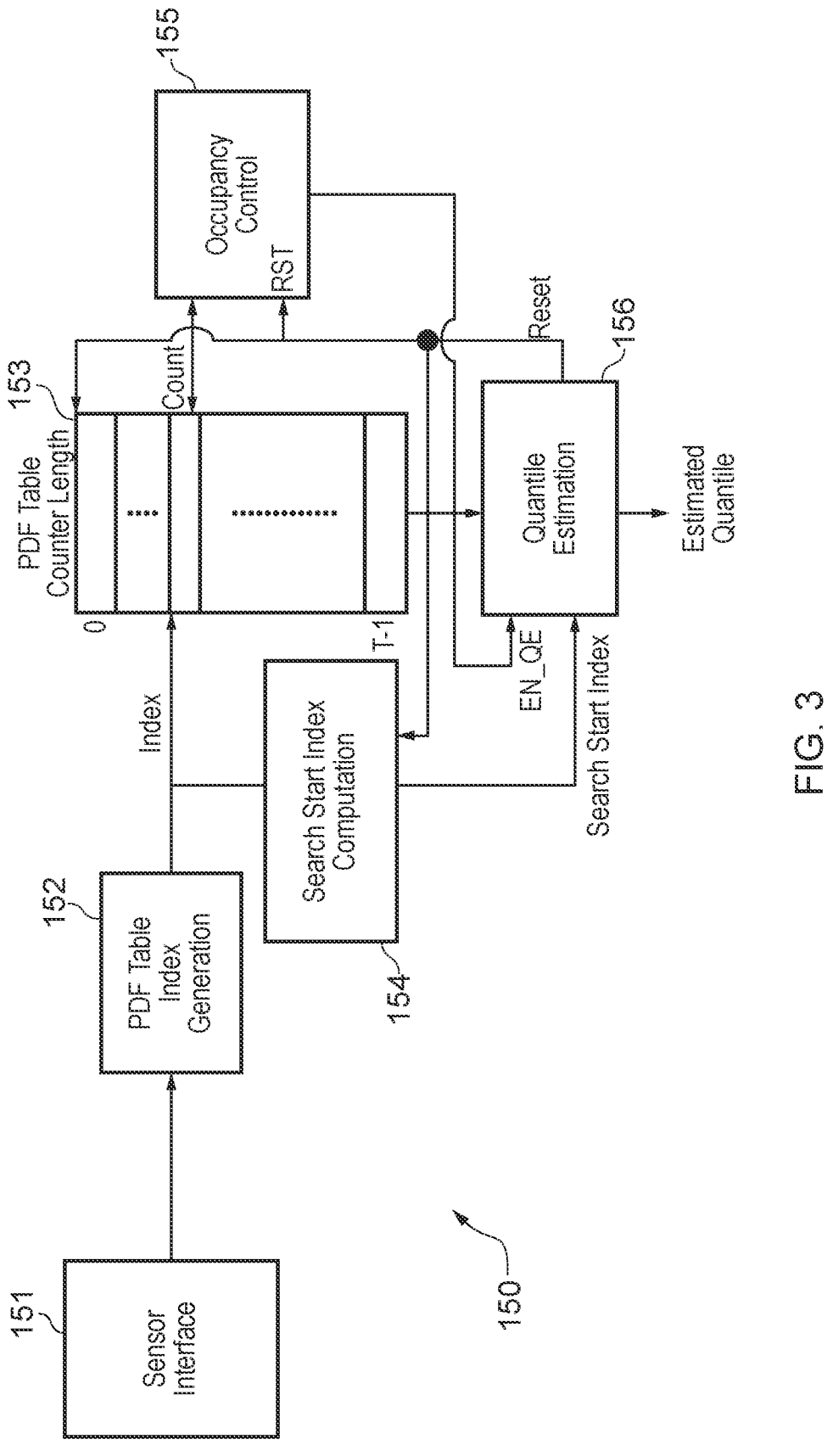
FIG. 3 schematically illustrates a general overview of the architecture of an apparatus in accordance with some examples.

FIG. 3 schematically illustrates some components of an apparatus 150 in accordance with some examples. A sensor interface 151 provides a sequence of data values which are received by probability distribution table (PDF) index generation circuitry 152, which maps a received data value to a particular counter of the PDF table 153. The PDF table 153 comprises a set of T counters (indexed in the figure from 0 to T−1). Each of the T counters is configured as a saturating counter. The PDF table index generation circuitry 152 translates and incoming data value from the sensor interface 151, subtracts a predetermined minimum pedestal value and scales the value by a set scaling value. The resulting value is used as an index into the PDF table 153. The index value thus generated is also received by the start search index computation circuitry 154, which keeps track of the index value associated with a smallest index which has a non-zero count. This smallest index pointer is later made use of in an accumulation operation of the quantile estimation. This feature is not essential but speeds up the calculation. In his absence the accumulation must start from the first index of the table. Occupancy control circuitry 155 monitors the counts accumulated by the counters in the PDF table 153. When the PDF table 153 reaches a predetermined level of occupancy (e.g. indicated by saturation of a given number of the counters), the occupancy control circuitry 155 causes the apparatus 152 switch from data population mode into its quantile estimation mode. The trigger for this is the signal EN_QE sent from the occupancy control circuitry 155 to the quantile estimation circuitry 156. The quantile estimation circuitry 156 determines an estimated quantile on the basis of the accumulated counts in the PDF table 153, then generates a reset signal which resets the PDF table 153 and the search start index computation circuitry 154, and the apparatus returns to its data population mode.

Figure 4:
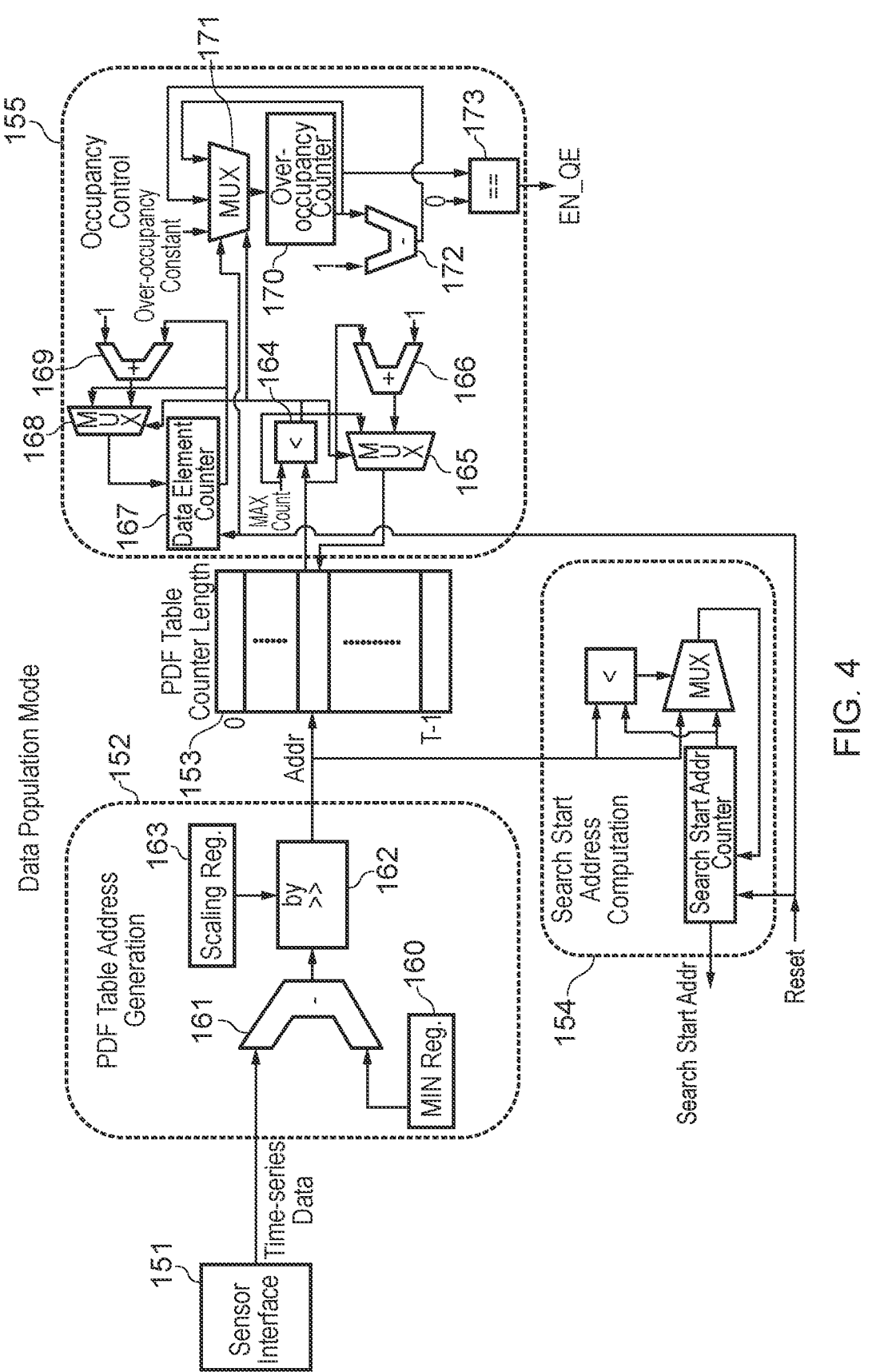
FIG. 4 schematically illustrates more detail of the components of an apparatus which are involved in a data population phase of its operation in accordance with some examples.

FIG. 4 provides further detail of the components of the apparatus 150 (from FIG. 3) which are active in its data population mode, i.e. the sensor interface 151, the PDF table address (index) generation circuitry 152, the PDF table 153, the search start index computation circuitry 154 and the occupancy control circuitry 155. Initially, i.e. following a reset from the quantile estimation circuitry 156, all of the saturating counters in the PDF table 153 are initialised to zero. Time-series data received by the sensor interface 151 has the minimum value stored in minimum register 160 subtracted by means of the subtraction circuitry 161, and the resulting value is scaled by scaling circuitry 162 in dependence on the scaling factor stored in scaling register 163. This generates an index (address) into the PDF table 153. When an entry (counter) of the PDF table 153 is accessed, its value is first read and compared against a maximum count constant value by comparison circuitry 164. The result of this comparison controls the selection made by multiplexer 165, selecting between the maximum count constant value and an incremented version (generated by increment circuitry 166) of the value read from the entry. The result of this selection is then written back into the table entry. A data element counter 167 is also provided, which keeps track of the data entries in the PDF table 153. The output of the comparison circuitry 164 is used to control the counting of the data element counter 167, by means of a selection by multiplexer 168 selecting between the current value held by the data element counter 167 and an incremented version of that value (incremented by incrementer 169). Note that, where the output of the comparison circuitry 164 controls the multiplexer 168, the data element counter 167 is only incremented if the count read from the table entry does not exceed the maximum count constant value. Over-occupancy counter circuitry 170 is initialised (i.e. following a reset from the quantile estimation circuitry 156) with the total number of elements which the PDF table can accommodate, i.e. T (the "over-occupancy constant") and is decremented (by means of decrementer 172) each time a counter saturates. Once it reaches zero, this is determined by comparator 173, which generates the EN_QE signal triggering the switch for the apparatus from data population mode to the quantile estimation mode.

Figure 5:
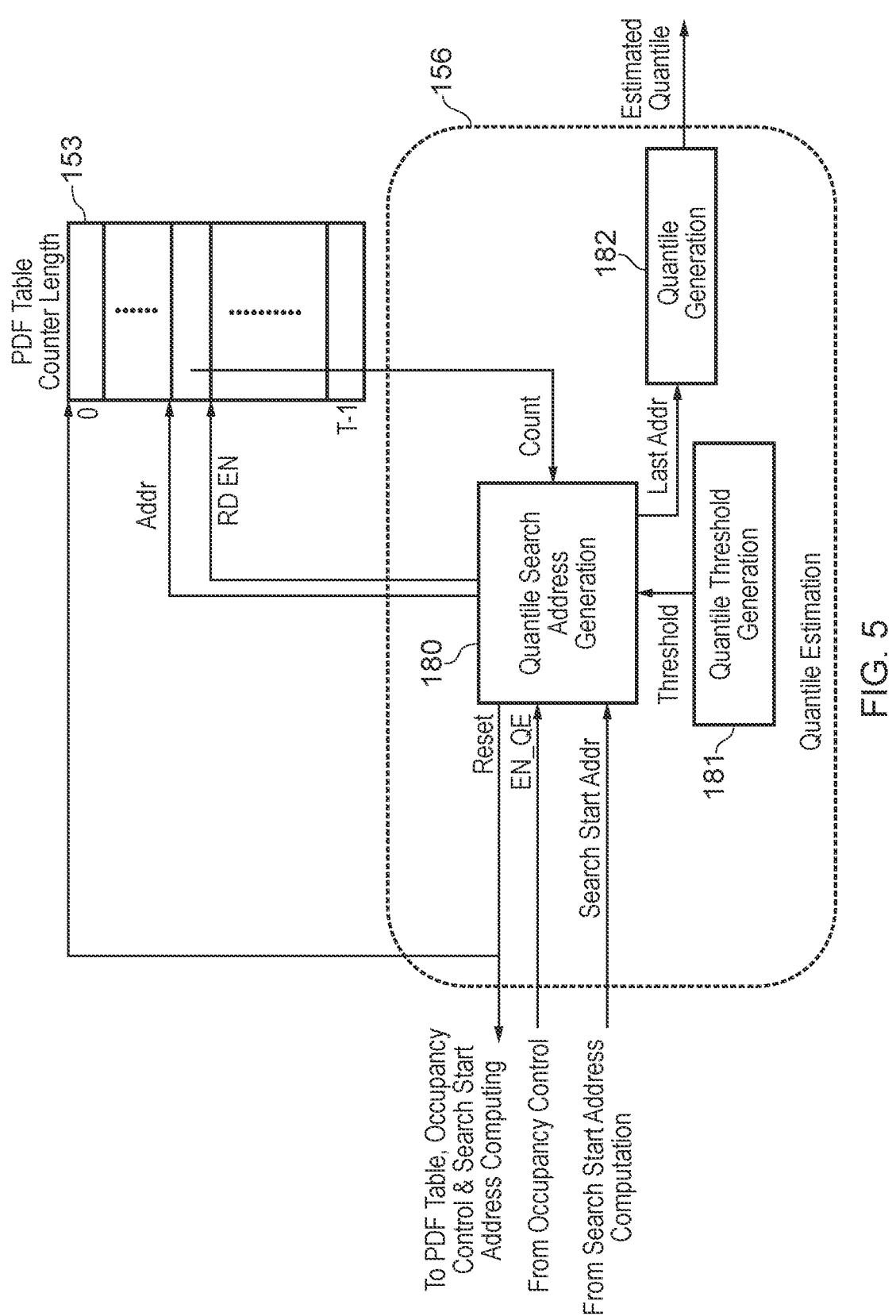
FIG. 5 schematically illustrates more detail of the components of quantile estimation logic in an apparatus in accordance with some examples.

FIG. 5 provides further detail of the components of the apparatus 150 (from FIG. 3) which are active in its quantile estimation mode, i.e. the quantile estimation circuitry 156 and the PDF table 153. The three components of the quantile estimation circuitry 156 shown are the quantile search address generation circuitry 180, the quantile threshold generation circuitry 181, and the quantile generation circuitry 182. Further detail of these three components will be explained in more detail below with reference to FIGS. 6, 7A, and 7B. When the occupancy control circuitry 155 gives control to the quantile estimation circuitry 156 by the assertion of the signal EN_QE, the quantile estimation circuitry 156 first reads the search start address counter in the search start address computation circuitry 154. It then accesses the PDF table 153 and starts reading from this address.

Figure 6:
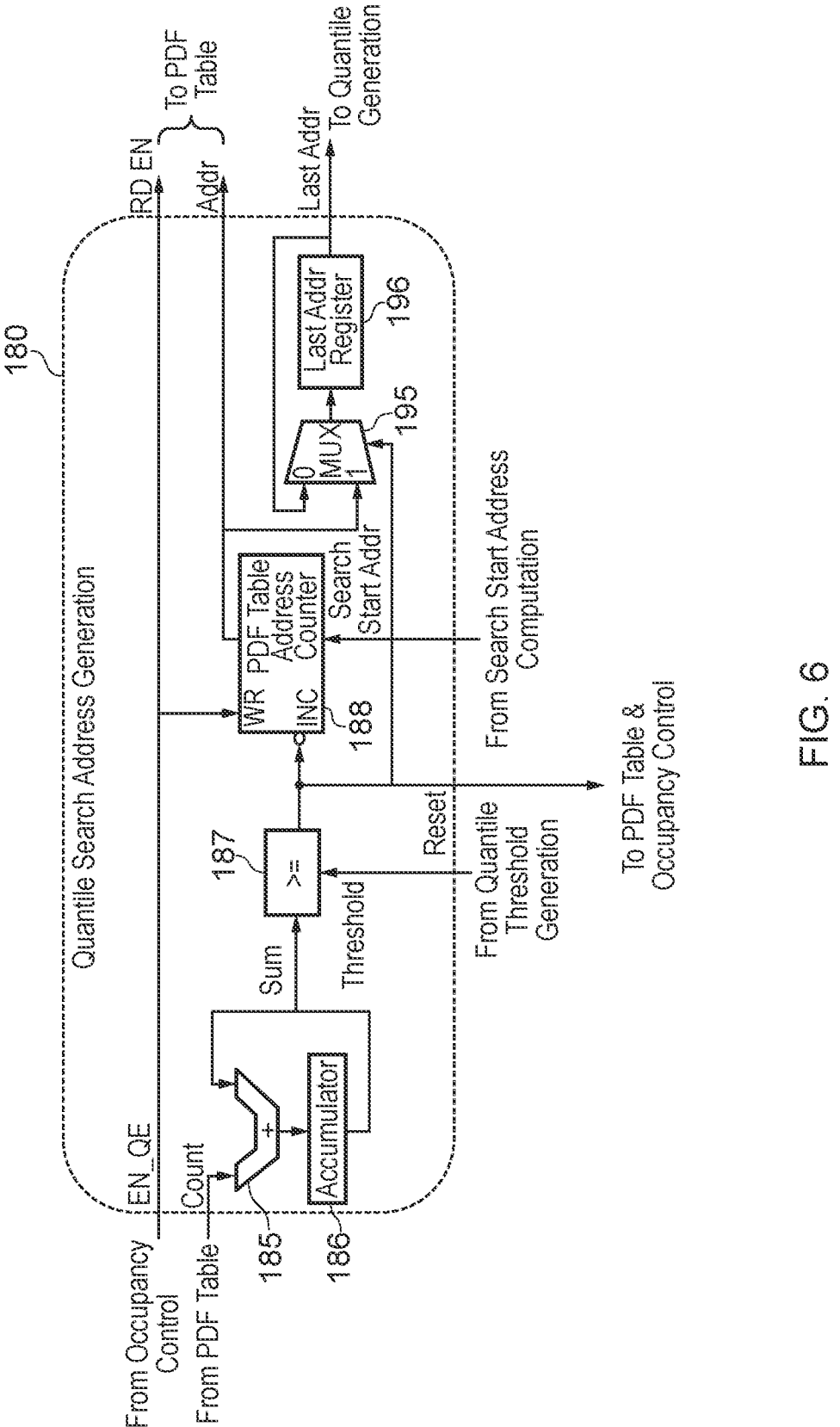
FIG. 6 schematically illustrates more detail of the components of quantile search address generation logic in an apparatus in accordance with some examples.
Figures 7A, 7B:
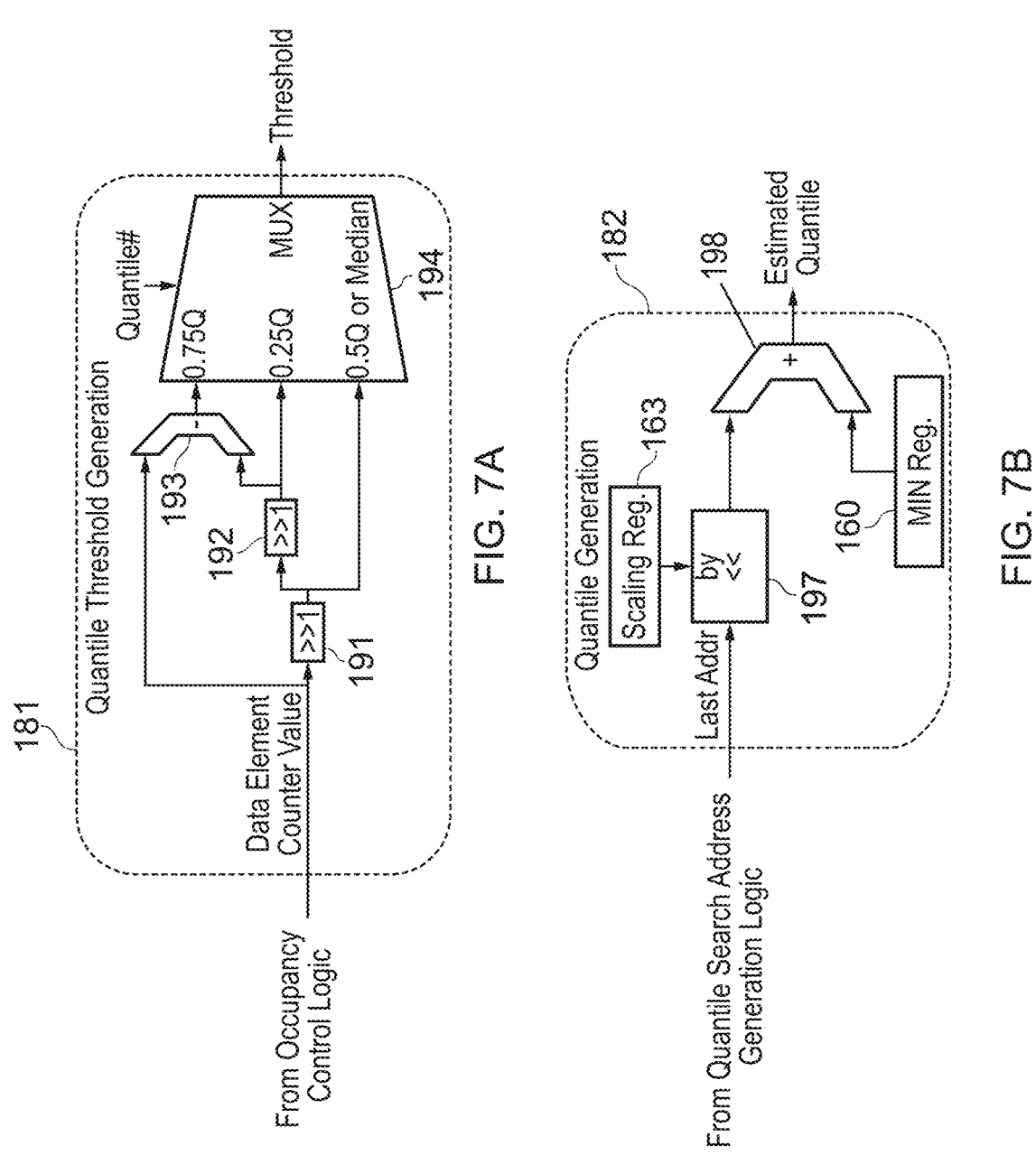
FIG. 7A schematically illustrates more detail of the components of quantile threshold generation logic in an apparatus in accordance with some examples.
FIG. 7B schematically illustrates more detail of the components of quantile generation logic in an apparatus in accordance with some examples.

The quantile search address generation circuitry 180 is shown in more detail in FIG. 6. Triggered by the assertion of the signal EN_QE, the quantile search address generation circuitry starts accumulating the index values from the PDF table until a threshold is reached. The PDF table 153 is accessed by incrementing the PDF table address counter 188, which begins counting from the search start address provided by the search start address computation circuitry 154 (see FIG. 4). The accumulation of the index values is performed by the addition circuitry 185 and accumulator 186. The value accumulated by the accumulator 186 is compared by comparator 187 against the threshold value provided by the quantile threshold generation circuitry 181. More detail of the quantile threshold generation circuitry is given in FIG. 7A. The quantile threshold generation circuitry 181 receives the data element counter value as counted by the data element counter 167 and, in the example of FIG. 7A is configured to generate a threshold corresponding to the first quartile ("0.25"), the second quartile ("0.5") or "median", and the third quartile ("0.75") in terms of data element counts. These are generated for the binary encoded values handled by means of right-shifting circuitry 191 and 192, and the subtraction circuit 193. That is, a one-bit right shift of the data element counter value provides the halved value (for "0.5"), a further a one-bit right shift provides the quartered value (for "0.25"), and subtracting the quartered value from the original value (for "0.75") gives the third quartile index. These three values are selected between by the multiplexer 194 steered by a quantile selection value ("quantile #"). Returning to FIG. 6, once the threshold is reached by the index values accumulated by the accumulator 186, the incrementing of the PDF table address counter 188, and the last address reached is sent to the quantile generation circuitry 182 to generate the estimated quantile value for the time-series data. The last address is selected by the multiplexer 195 being caused to switch between its inputs by the "threshold reached" signal from comparator 187 and the last address register 196 then receiving this (current) last address, as shown in FIG. 6. FIG. 7B shows more detail of the quantile generation circuitry 182, which is configured to perform the inverse operation of the PDF table address generation circuitry 152 (see FIG. 4). Where the PDF table address generation circuitry 152 converted an input data value into a PDF table address, the quantile generation circuitry 182 converts a PDF table address into a data value. The last address received is scaled in dependence on the scaling factor stored in scaling register 163, by scaling circuitry 197 and the resulting value is then added to the minimum value stored in minimum register 160 means of the addition circuitry 198. The estimate quantile value is thus produced.

The bit-width of the counters that form the PDF table is a parameter which will vary depending on the implementation. Generally speaking, the required bit-width depends on the number of data elements (P) in the time-series. To take one extreme, a saturating counter, c, requires a bit-width which is wide enough to cover the unlikely scenario in which all data elements in the time-series are the same, in which case c must be $\log_2(P)$, since all N data elements are the same and hence all N elements map to the same counter. The counter must be wide enough to count up to the middle point, which is N/2+1. Therefore, the theoretical maximum bit-width for c is $\log_2(N/2+1)$. In reality, data distribution in time-series or streaming data is highly unlikely to exhibit this behaviour and so c can be much lower than $\log_2(N/2+1)$. In fact, the counter bit-widths do not have to be of the same length. The two edge counters (at the index 0 and T−1) can have higher bit-widths than the counters in-between. The reason is that for a median calculation, the interest is not in the outliers, but values in-between. The size of the counter table can be reduced much further and the two edge counters can keep track of outlier data points with wider counter bit-widths, while the rest of the counters in between can have a narrow bit-width.

Concerning the bit-width of the counters, a further part of the present disclosure is the discovery that in fact the counters can be reduced to a single bit and the apparatus can still generate a useful quantile estimate. Moreover, by comparison to configurations with wider bid-widths for each counter, a configuration with single bit counters can generate the quantile estimate more quickly, which in some implementations may be an important consideration. In such a configuration, in which the bit-width of the counters is reduced to into a single bit, the PDF table essentially becomes a bit vector table. When a data value is received and an access to the table is made, the corresponding entry for that data value has it bit set. Further accesses to the same location will not make any changes if the bit is set. In circumstances in which the data values are relatively evenly spread across the data range, i.e. that the distribution is not skewed, this approach has been found to provide surprisingly good quantile estimate values. The premise is that if the distribution is not skewed across the table, then the quantiles should be able to be estimated even with a bit vector table when the number of data points is large (i.e., the law of large numbers). The technique will still have two modes similar to the aforementioned histogram-based PDF table approach, that is a data population mode followed by a quantile estimation mode. The key difference between the two is that the quantile estimation mode in the bit vector table approach is notably faster, obtaining the quantiles in a single cycle.

Figure 8:
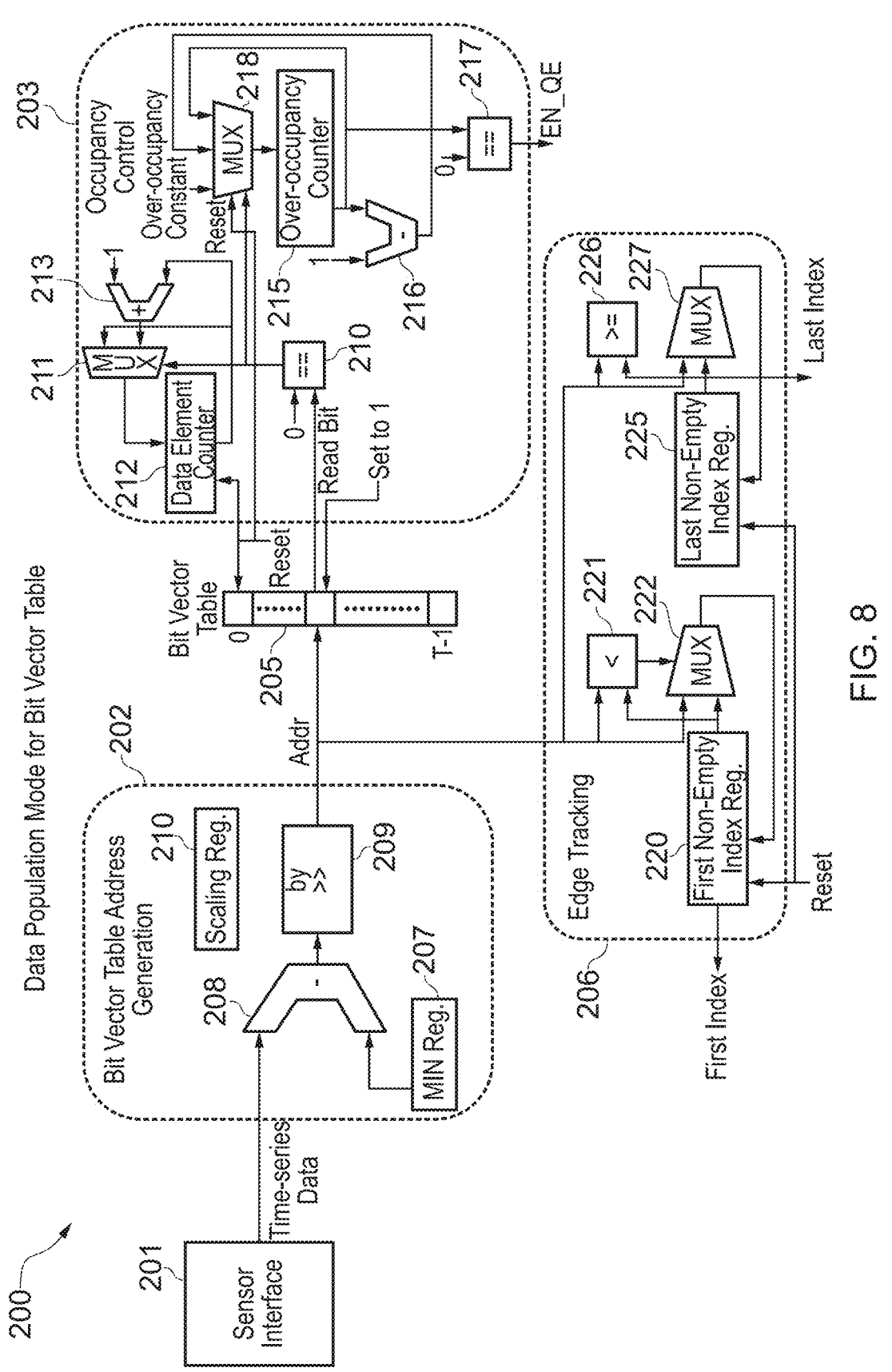
FIG. 8 schematically illustrates more detail of the components of a bit vector variant of an apparatus which are involved in a data population phase of its operation in accordance with some examples.

FIG. 8 shows an example set of components which provide to support the data population mode for a bit vector table in an apparatus 200. These are the sensor interface 201, the bit vector table address (index) generation circuitry 202, the bit vector table 205, the occupancy control circuitry 203, and the edge tracking circuitry 206. Initially, i.e. following assertion of the reset signal, all of the single bit counters in the bit vector table 205 are initialised to zero. Time-series data received by the sensor interface 151 has the minimum value stored in minimum register 207 subtracted by means of the subtraction circuitry 2086, and the resulting value is scaled by scaling circuitry 209 in dependence on the scaling factor stored in scaling register 210. This generates an index (address) into the bit vector table 205. When an entry (counter) of the PDF table 153 is accessed, its value is read and compared against 0, since each entry of the bit vector can only be set as 0 or 1. The comparison circuitry 210 performing this comparison generates a result, which controls the selection made by multiplexer 211. The multiplexer 211 determines the counting of the data element counter 212, which keeps track of the number of data entries in the bit vector table 205. The multiplexer 211 selects between the current value held by the data element counter 212 and an incremented version of that value (incremented by incrementer 213). Hence, when the comparator 210 indicates that the bit read from the entry of the bit vector had not previously been set, the data element counter 212 is incremented. Otherwise, when the entry has already had its bit set, it stays at its current count. Over-occupancy counter circuitry 215 is initialised (i.e. following assertion of the reset signal) with the total number of elements which the bit vector comprises, i.e. T (the "over-occupancy constant") and is decremented (by means of decrementer 216) each time a bit of the bit-vector is set (by selection by the multiplexer 218 controlled by the output of comparator 210). Once it reaches zero, this is determined by comparator 217, which generates the EN_QE signal triggering the switch for the apparatus from data population mode to the quantile estimation mode. The address (index) output by the bit vector table address generation circuitry 202 is also provided to the edge tracking circuitry 206, which keeps track of two table indices—the first and last non-empty vectors. The first non-empty index register 220 holds the first index and the multiplexer 222 keeps that value in place, unless the comparator 221 indicates that a lower index is generated. Similarly, the last non-empty index register 225 holds the last index and the multiplexer 227 keeps that value in place, unless the comparator 226 indicates that a higher index is generated. These two indices are then used to estimate the index of the quantile. The principle is that in a well-balanced data distribution, the indices between the first and last indices should be densely populated with 1s. There can be occasional 0s in between but this should not drastically affect the estimation accuracy.

Figure 9:
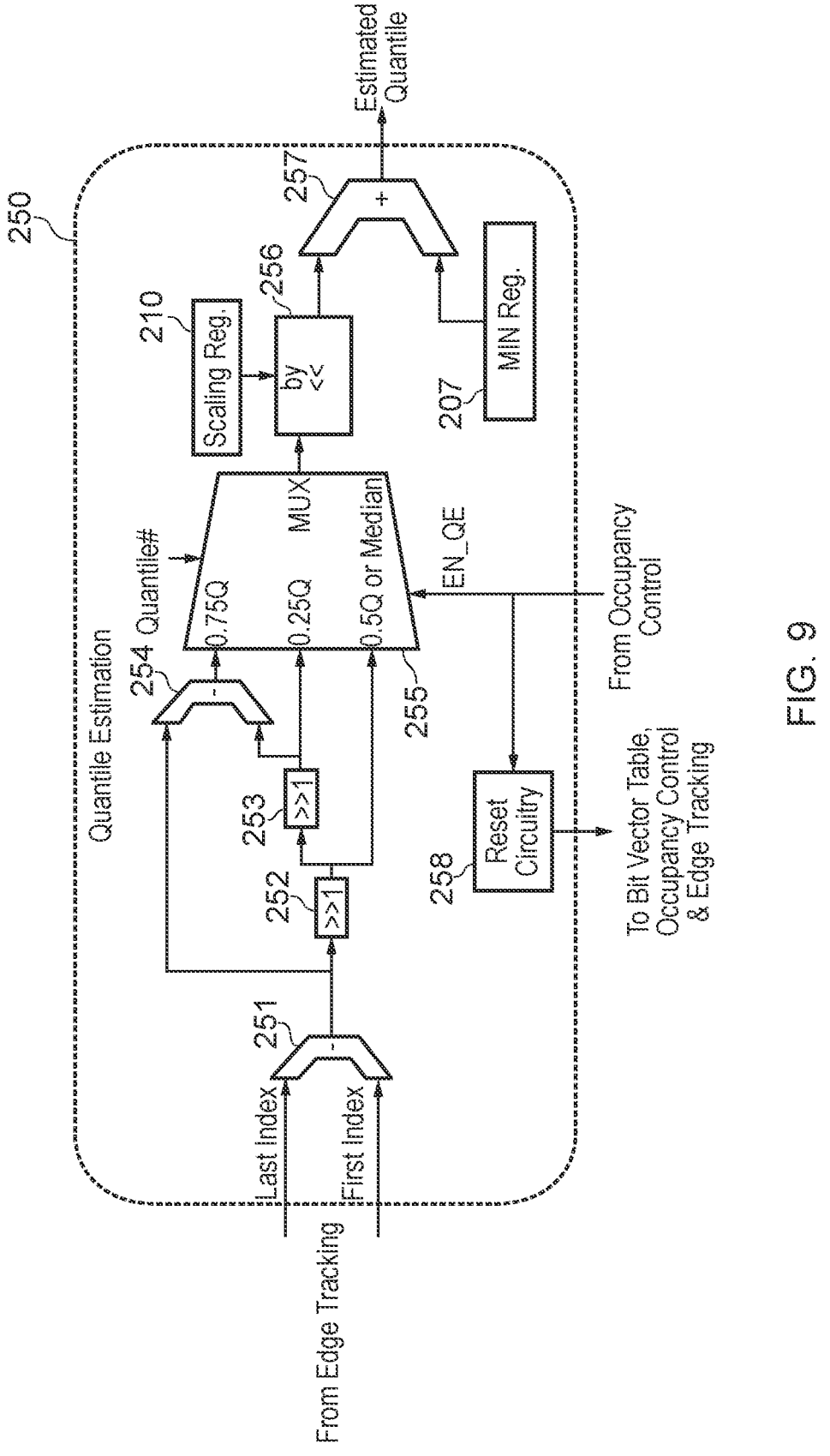
FIG. 9 schematically illustrates more detail of the components of quantile estimation logic in an apparatus in accordance with some examples.

FIG. 9 schematically illustrates the quantile estimation circuitry 250 provided as part of an apparatus 200 (other parts of which were described with reference to FIG. 8). The quantile estimation circuitry 250 receives the first and last index values from the edge tracking circuitry 206. Subtraction circuitry 251 subtracts the first index value from the last index value to generate an index range value. Here, the quantile estimation circuitry 250 is configured firstly to generate a threshold index (address) value corresponding to the first quantile ("0.25"), the second quantile ("0.5") or "median", and the third quantile ("0.75") as these map onto the bit vector table 205. These are generated for the binary encoded values handled by means of right-shifting circuitry 252 and 253, and the subtraction circuit 254. That is, a one-bit right shift of the index range provides the halved value (for "0.5"), a further a one-bit right shift provides the quartered value (for "0.25"), and subtracting the quartered value from the original value (for "0.75") gives the third quartile index. These three index values are selected between by the multiplexer 255 steered by a quantile selection value ("quantile #"). The index value thus selected is then converted back into a data value, by means of the scaling factor stored in scaling register 210 applied by scaling circuitry 256, with the resulting value then added to the minimum value stored in minimum register 207 by means of the addition circuitry 257. The estimate quantile value is thus produced. The quantile estimation circuitry 250 further comprises reset circuitry 258, which in response to the EN_QE signal from the occupancy control circuitry 203, causes the bit vector table 205, the occupancy control circuitry 203 and the edge tracking circuitry 206 to reset.

Figure 10:
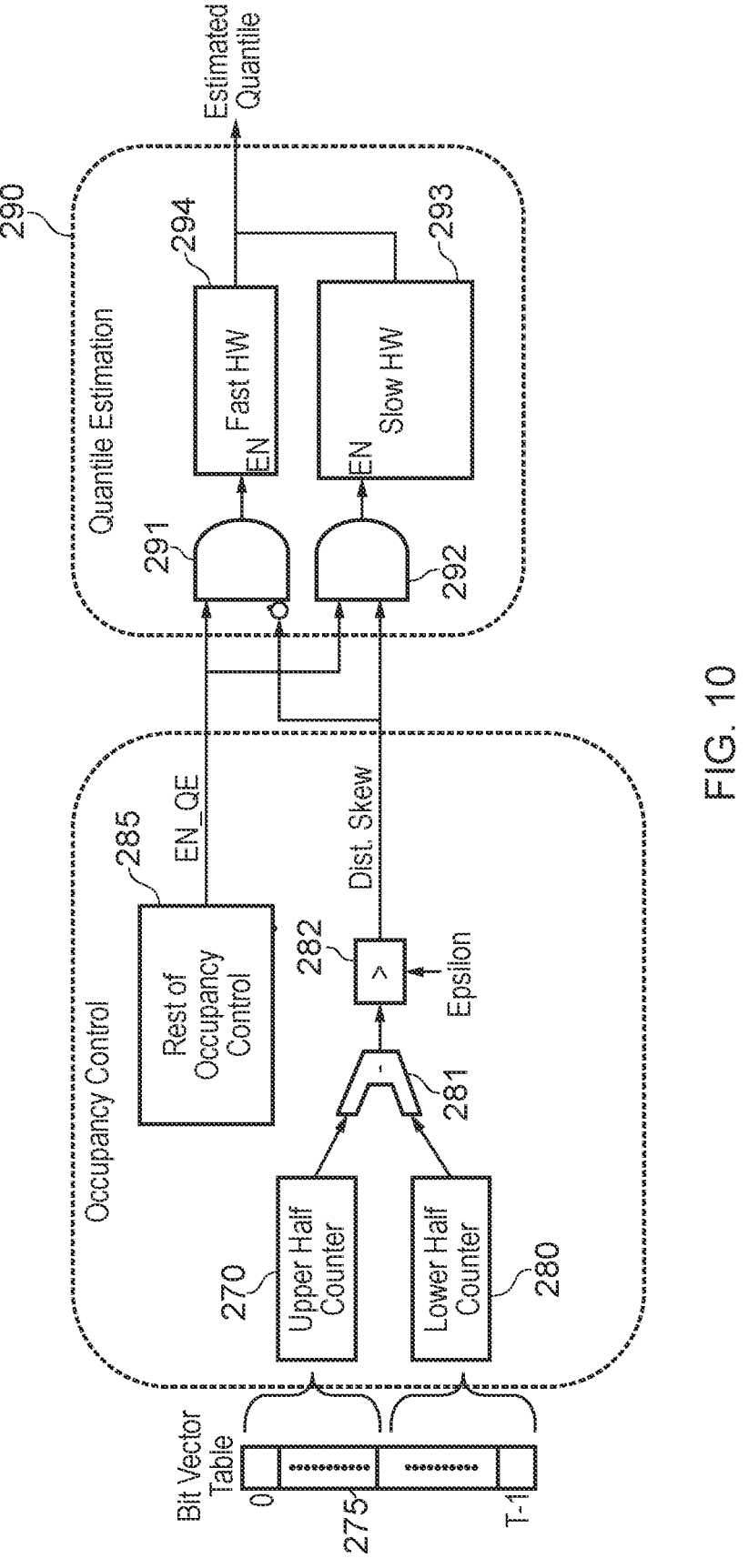
FIG. 10 schematically illustrates more detail of the components of occupancy control logic and quantile estimation logic in an apparatus in accordance with some examples.

As mentioned above, it has been observed in the development of the present techniques that the accuracy of the estimated quantile values generated can be affected by the skewedness of the data distribution. In particular, the accuracy of the estimated quantile values generated by the bit-vector table embodiment (as opposed to the PDF table embodiment) are more affected by the skewedness of the data distribution. In consequence, one approach to this issue proposed here is to detect the skewedness in the distribution, and if the distribution is not skewed, then the quantile value(s) can be estimated fast (i.e., in a single cycle) by deriving the quantile index from the first and last non-zero indices. If skewedness is detected in the distribution, then the quantile can be estimated by accumulating the number of is starting from the first non-zero index. This will estimate the quantile slowly, but more accurately. Accordingly, a hybrid apparatus may be arranged, as is schematically illustrated by FIG. 10. This apparatus is configured to have a default operation to estimate the quantiles using the "fast hardware" if the data distribution is reasonably balanced at both tails. However, if skewedness in the data distribution is population mode, the occupancy control circuitry compares these two counters, by means of the subtraction circuitry 281. If the difference is greater than some fixed epsilon value (comparator 282 and input epsilon value), the distribution is considered to be skewed. Otherwise, there is no skew in the distribution. In combination with EN_QE (Enable Quantile Estimation) signal from the rest of the occupancy control circuitry 285, the quantile estimation circuitry 290 selects (by means of AND gates 291 and 292 whether to use the slow hardware (HW) 293 or the fast hardware (HW) 294 to estimate the quantile. An example of the fast hardware is given by the configuration shown in FIG. 8. An example of the slow hardware is shown in FIGS. 6 and 7A/B, with the modification that the PDF table is now a bit vector table and the count in each table entry is a single bit.

A further difference between the techniques proposed here (PDF table vs bit vector table) is the amount of storage required to implement the respective techniques. Table 1 shows the amount of storage is needed for the histogram-based PDF table including the size of registers and PDF table for exact quantile determination for an example set of ECG data with a data range [76, 9999], approximate quantile estimation for the set of ECG data with a data range [76, 9999], and approximate quantile estimation for data that have a wide range of 100,000. The approximate histogram-based PDF table technique has a PDF table of 4-bit 64 counters, and it requires around 40B of register state while this is only 18B for the 64-bit vector configuration.

TABLE 1

Storage cost analysis comparison of exact histogram-based PDF table technique with approximate histogram-based PDF table technique that uses a PDF table of 4-bit 64 counters as well as the proposed bit vector table technique of 64 bits

| # of Bits | Exact histogram-based PDF table technique for ECG Data of Range [76, 999] | Approximate histogram-based PDF table with a PDF table of 4-bit 64 counters for ECG Data of Range [76, 999] | Approximate histogram-based PDF table technique with a PDF table of 4-bit 64 counters for a Data Range of 100,000 | Approximate Bit Vector Table technique of 64 bits for a Data Range of 100,000 |
|---|---|---|---|---|
| Scaling Reg. | 1 | 3 | 4 | 4 |
| Search Address Counter | 10 | 6 | 6 | 6 |
| MIN Reg. | 16 | 16 | 32 | 32 |
| PDF Table | =924 * 5 = 4620 | =64 * 4 = 256 | =64 * 4 = 256 | 64 |
| Over-occupancy Counter | 15 | 10 | 10 | 7 |
| Accumulator | 15 | 10 | 10 | 7 |
| Data Element Counter | 15 | 10 | 10 | 7 |
| PDF Table Address Counter | 10 | 6 | 6 | 6 |
| Last Address Register | 10 | 6 | 6 | 6 |
| TOTAL | 4712 (0.6 kB) | 323 (40 B) | 340 (43 B) | 139 (18 B) | detected, then the "slow hardware" is used. The skewedness in the data distribution is detected by the occupancy control circuitry. One way of detecting skewedness is to subdivide the bit vector table 275 into two parts, and keep a count of the is in each half as shown in FIG. 10 by the upper half counter 270 and the lower half counter 280. In fact, these counters track all the data items observed including the data items beyond both edges of the table. At the end of the data Measurements of the average number of steps or cycles to estimate the approximate median using the slow hardware for different bit vector table size as shown in Table 2. It only takes T/2 steps to estimate the median where T is the number of entries in the table irrespective of the number of data elements. The overall complexity of estimating the median when using the slow hardware is T/2.

TABLE 2

| | | |
|---|---|---|
| Number of steps or cycles to estimate the median in slow hardware | | |
| Table Size (T) | Number of Steps or Cycles | Relationship between the Table size and Time to find the median |
| 64 | 30 | ~T/2 |
| 128 | 59 | ~T/2 |
| 256 | 116 | ~T/2 |
| 512 | 231 | ~T/2 |

Figure 11:
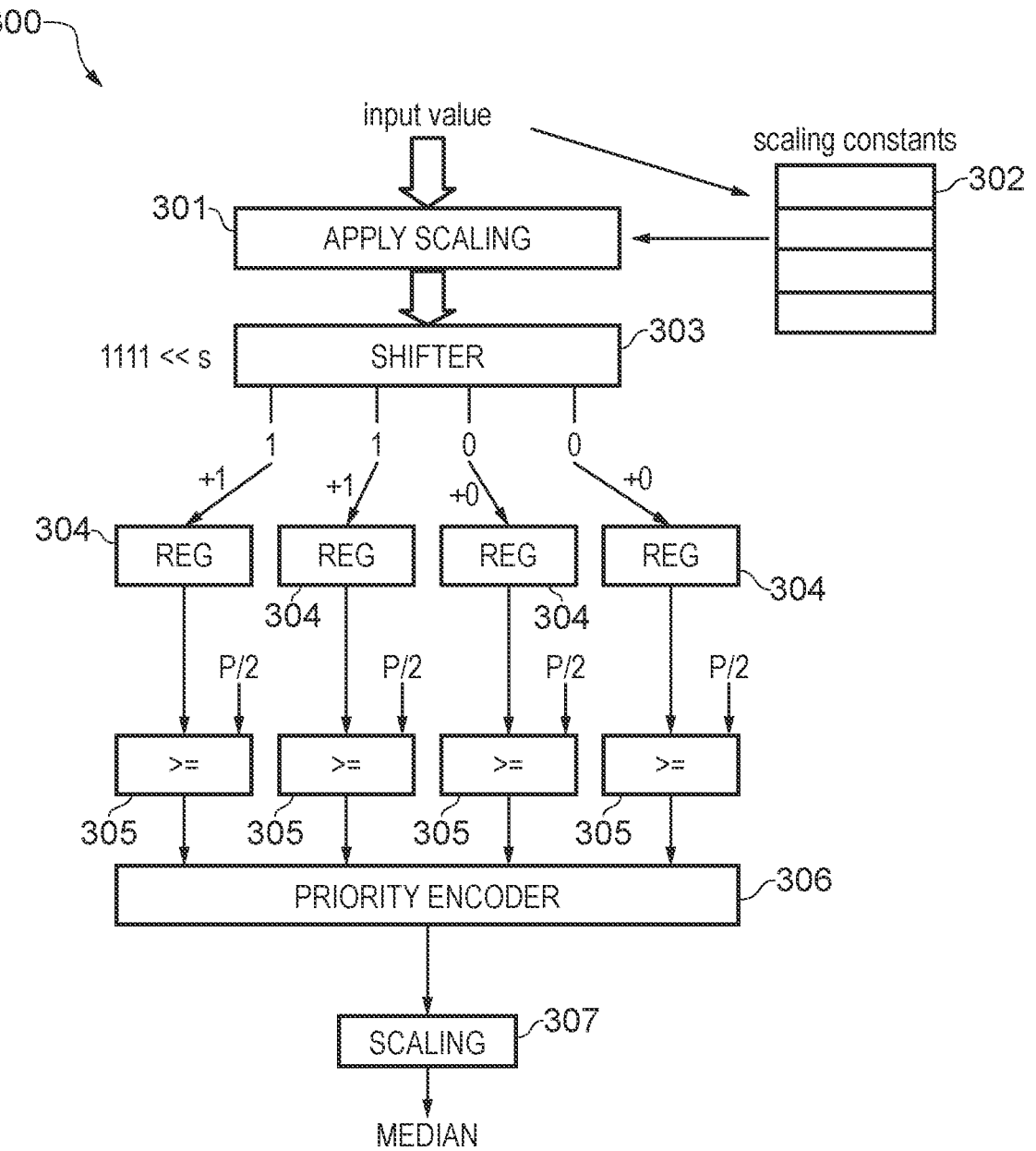
FIG. 11 schematically illustrates an arrangement for fast determination of a median value in accordance with some examples.

A further different embodiment 300 is schematically illustrated in FIG. 11, which has been constructed with the aim of generating the median as fast as possible. In this embodiment, a more parallel structure is used to capture key properties of the distribution of data as data arrives. The approach taken is for a set of registers containing cumulative histograms to be incremented simultaneously as the data values arrive and these incremented values are checked (in parallel) against a constant representing the middle point of the dataset. The output of these gates is then processed by a priority encoder in order to compute the median. In the example of FIG. 11, an input value is scaled 301 according to a scaling factor selected from a set of scaling constants 302, noting that further advantage of this embodiment is that the scaling constants table is indexed by the incoming data itself. The scaled input value controls the shift of a set of 1's by shift circuitry 303, where the number of 1's corresponds to the number of histogram bins established for this configuration. In the illustrated example of FIG. 11, this is a set of four 1's matching the four histogram bin registers 304. A greater input value generates a greater shift, such that the lowest data value in the range results in a set of four 1's being produced by the shifter 303 and the highest value in the range results in the pattern 0001 being produced by the shifter 303. The output of the shifter 303 is applied (accumulated) in parallel to the four histogram registers 304, with the resulting value in each being compared by comparison circuitry 305 (">=") with the value P/2, where P is the number of data items over which the median will be determined, i.e. P/2 represents a count value half way through the set of data items over which the median is to be determined. The outputs of the comparators 305 forms the input to the priority encoder 306, which then selects the bin corresponding to the selected median value and a final scaling step 307 converts this bin number into a median data value. Accordingly, the example of FIG. 11 enables a trade-off to be made between the hardware complexity and speed, in that with very little hardware a useable estimate of the median value can be very quickly generated. This may be the preferred balance of the trade-off, since time can be a crucial constraint, e.g. in some real-time scenarios. Indeed, it is further contemplated that the benefits of both approaches may be combined, for example where a configuration such as that shown in FIG. 11 is deployed with a limited number of histogram registers 304 be used in a first pass over the data to quickly obtain a rough estimate of the median and the applicable range of the data elements. A second pass over the data can then be performed with a configuration such as that shown in of FIG. 4 making use of the rough estimate of the median and the applicable range of the data elements to be more "centred" around the region of interest and operating at a finer granularity. In this scenario, it would also be possible to perform data population and subsequent median-finding with more targeted settings for parameters such as the scaling constant, min and max range values.

Figure 12A:
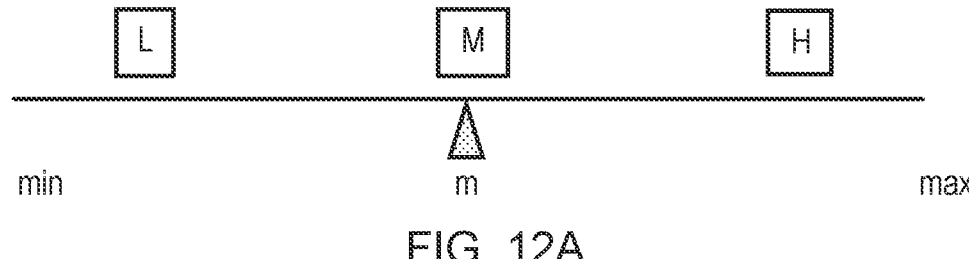
FIGS. 12A-12D show the principle of operation of the fulcrum-based quantile estimation technique disclosed herein in accordance with some examples.
Figure 12B:
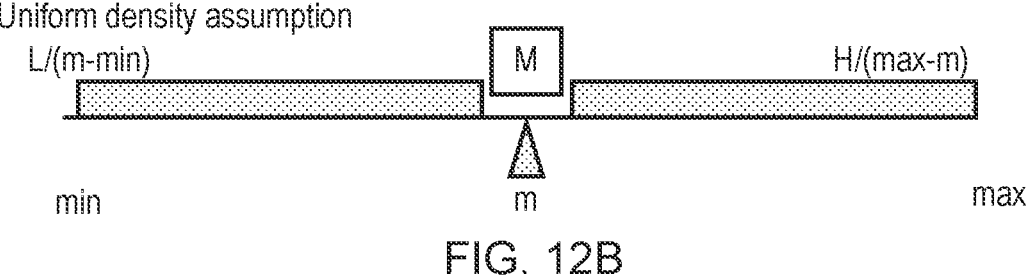
Figure 12C:
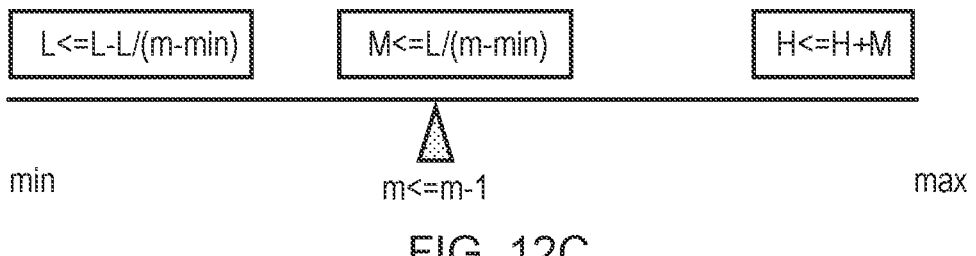
Figure 12D:
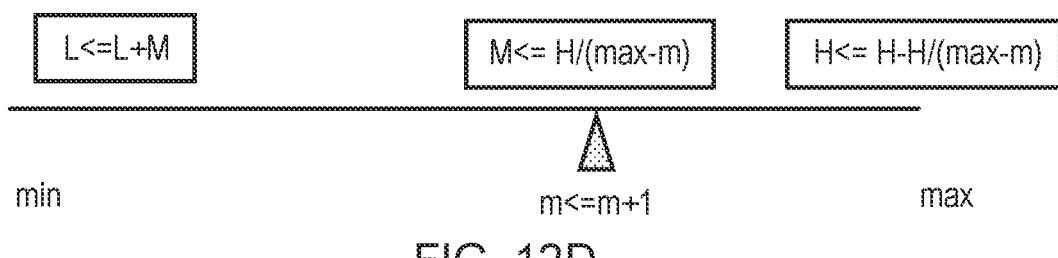

A further variant approach to the provision of a quantile estimation is now discussed with reference to FIGS. 12A-D, 13A-B, and 14. The technique is referred to herein as the "fulcrum-based" technique. According to this technique, a current estimate of the median, m, is maintained, as well as three counters L, M, and H which count the "perceived" low, median value, and high number of entries relative to m. This principle is illustrated in FIG. 12A, from which it can be seen that whilst L and H hold approximately the same values, the fulcrum can be considered to be balanced. The initial value of m is essentially a guess (which may for example be provided by a randomised selection or a midpoint of an expected data range). As data values are received, the low (L) and high (H) counters keep track of the number of lower and higher values than the median point. Then, based on the status of these three counters, the median point is moved upwards or downwards by a constant offset. Assuming a uniform distribution of data values across the range, FIG. 12B illustrates the implicit assumption of the system. It is deviations from this assumption which underlie the approximation differences from the true median. For each data value d coming in, the updates to the counters may be represented as follows:

$L \Leftarrow L+1$ if $d<m$ else $L$ $H \Leftarrow H+1$ if $d>m$ else $H$ $M \Leftarrow M+1$ if $d==m$ else $M$ In other words: data values less than the current median estimate m cause the low counter L to be incremented; data values greater than the current median estimate m cause the high counter H to be incremented; and data values equal to the current median estimate m cause the middle counter M to be incremented. After a number of updates to the counters like this (for example after 8 updates), the estimated median point m is moved to seek to "balance the fulcrum". The movement is by a predefined increment (e.g. to add or subtract 1). The direction of movement is determined by comparing the current counts of the low, median, and high counters, whereby when L>M+H the estimated median is moved lower and when H>M+L the estimated median is moved higher. FIG. 12C shows an update instance where L>M+H, and hence to "balance" the "fulcrum" $m \Leftarrow m-1$, with the unit of "weight" being moved towards the upper side, i.e. $M \Leftarrow L/(m-min)$; $H \Leftarrow H+M$; and $L \Leftarrow L-L/(m-min)$. FIG. 12D shows an update instance where H>M+L, and hence to "balance" the "fulcrum" $m \Leftarrow m+1$, with the unit of "weight" being moved towards the lower side, i.e. $M \Leftarrow H/(max-m)$; $H \Leftarrow H-H/(max-m)$; and $L \Leftarrow L+M$.

Figures 13A, 13B:
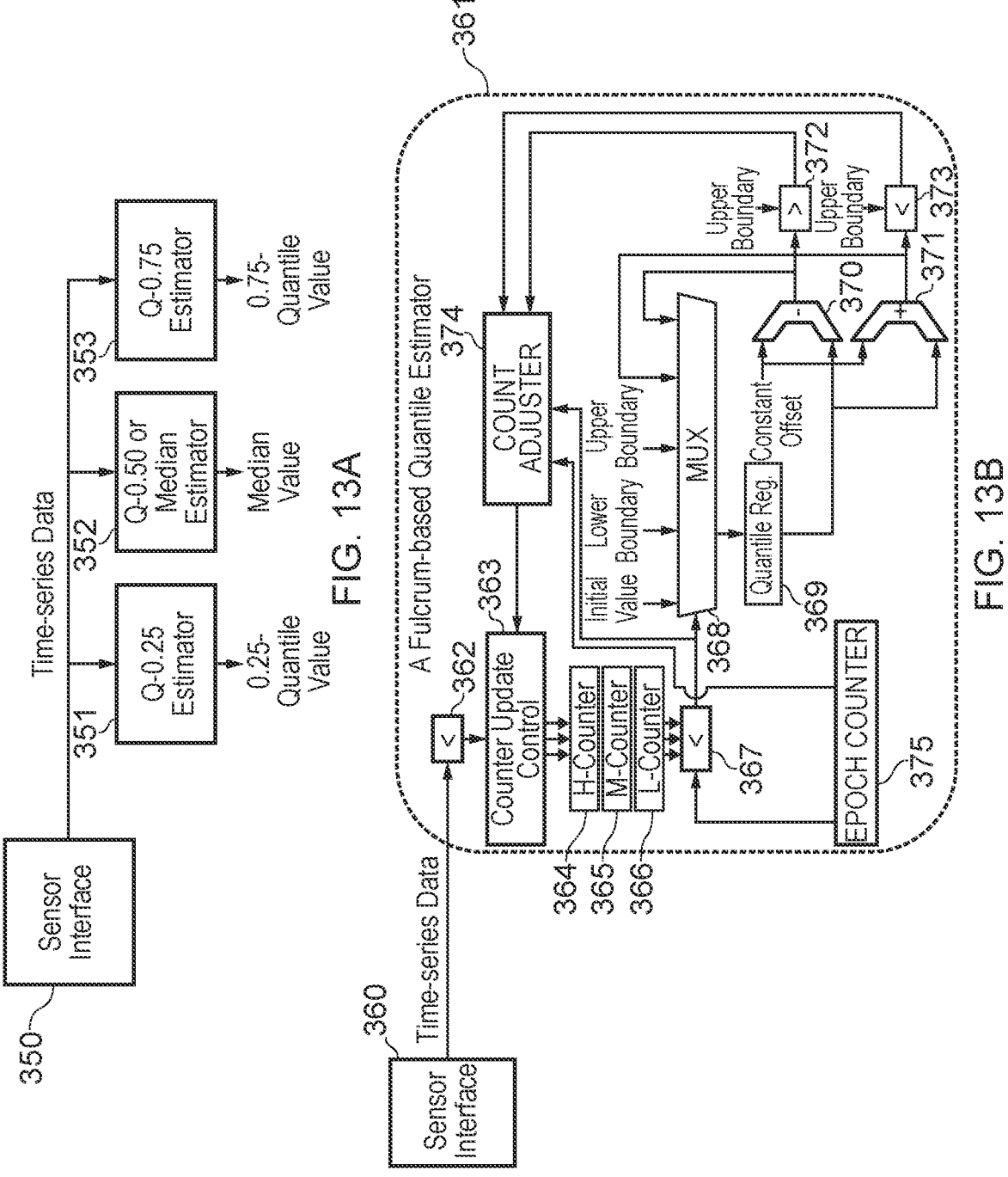
FIG. 13A schematically illustrates an overview of an apparatus for approximate quantile determination using the fulcrum-based quantile estimation technique in accordance with some examples.
FIG. 13B schematically illustrates in more detail some components of the apparatus for approximate quantile determination using the fulcrum-based quantile estimation technique in accordance with some examples.

FIGS. 13A and 13B schematically illustrate example apparatus configurations which support the "fulcrum-based" technique. The above discussion with reference to FIGS. 12A-D was provided in the context of providing an estimated median value, yet the technique can also be adapted to provide other quantile estimates. FIG. 13A schematically illustrates an example configuration in which a sensor interface 350 passes data values to three parallel estimators, configured to estimate the first, second (median), and third quartiles respectively. More detail of the configuration of each is generically shown in FIG. 13B, where the difference between each is the boundary values for each and the constant offset value. For example, the boundary values for the median are [MIN, MAX] of the time-series data. For the 0.25-quantile, the boundary values are [MIN, estimated MEDIAN] and for the 0.75-quantile, the boundary values are [estimated MEDIAN, MAX]. Note the limited hardware required for each quantile estimator, which only uses three counters and a register to hold the quantile value. For the combination logic, each uses a few comparators, two adders and a multiplexer. In the example of FIG. 13B, the sensor interface 360 provides time series data to a fulcrum-based quantile estimator 361. Each data value received is shifted as required by the range of the counters being operated by the shifter 362, before being passed to the counter update control 363. Counter update control 363 determines which of the three counters should be updated on the basis of the data value received, and causes the respective counter, H counter 364, M counter 365, or L counter 366 to be incremented. Comparator 367 compares the counts held by the respective counters all (in particular determining when L>M+H and when H>M+L) and controlling multiplexer 368 on that basis. An epoch counter 375 determines the time interval between the adjustments of the quantile register 369. The multiplexer 368 controls the value maintained in the quantile register 369. Initially, the quantile register holds an externally provided initial value. In accordance with the updating process described above with reference to FIGS. 12C and 12D, and to be described further below with reference to FIG. 14, the multiplexer causes the updates to the estimated quantile to be made, either incremented or decremented by the constant offset. Subtraction circuitry 370 and addition circuitry 371 provide this function. The updated estimated quantile is passed back as an input to the multiplexer as well as providing an input to the subtraction circuitry 372 or 373, which calculates the difference between the revised estimated quantile and the lower or upper boundary value respectively. The result of these calculations are provided to count adjuster circuitry 374, which also receives a signal from the epoch counter 375 indicating when adjustment to the quantile register should occur. The count adjuster circuitry 375 also receives the output from the comparator 367 which evaluates the counts held by the respective counters H, M, and L (364, 365, and 366) to determine which counters will be subsequently updated and the magnitude of the updates. The counter update values are computed in the count adjuster circuitry using the values from the subtraction circuitry 372 and 373 as input.

Figure 14:
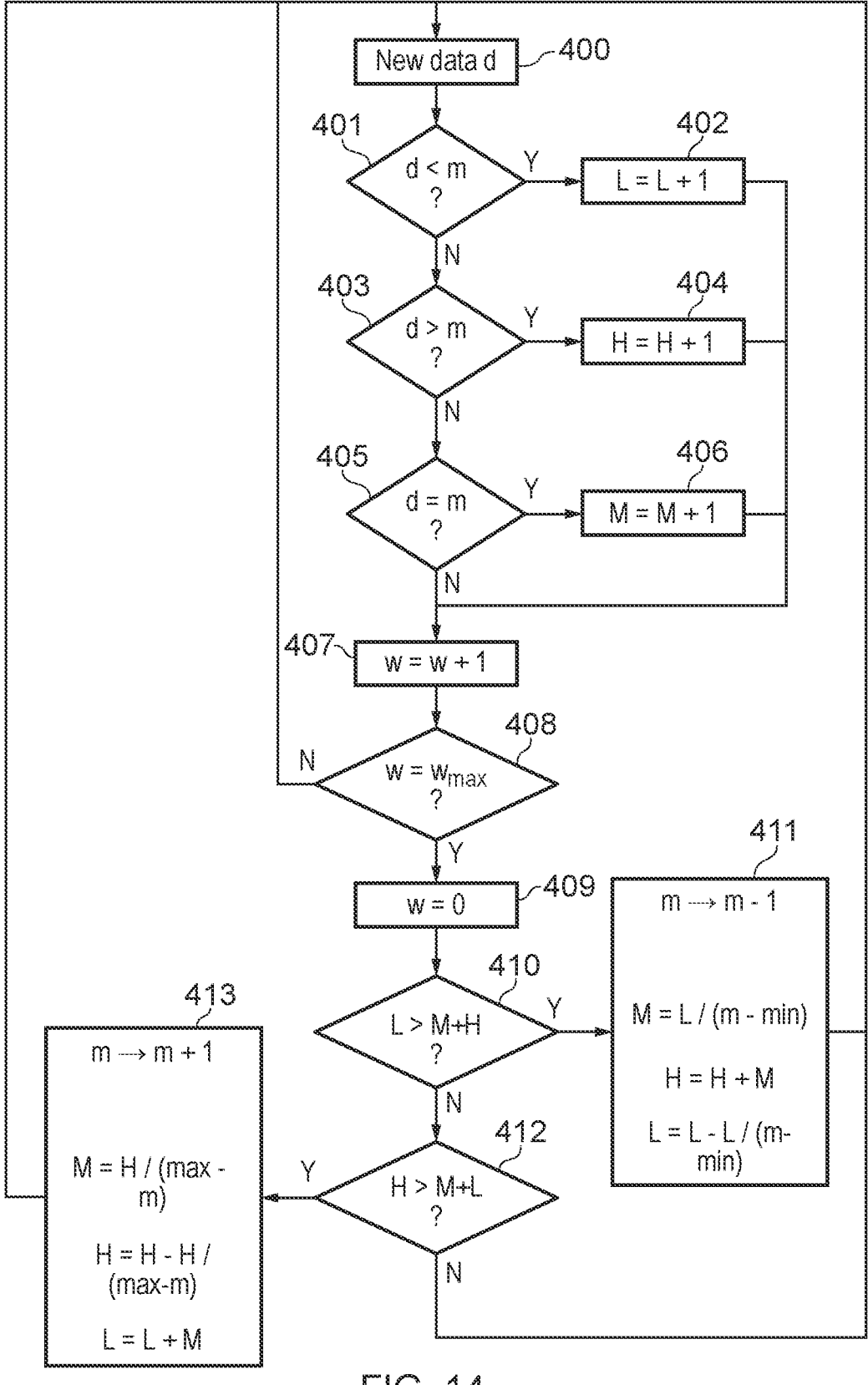
FIG. 14 is a flow diagram showing a sequence of steps which are taken when implementing the fulcrum-based quantile estimation technique in accordance with some examples.

FIG. 14 is a flow diagram showing a sequence of steps which are taken when implementing the fulcrum-based quantile estimation technique in accordance with some examples. A new data value d is received at step 400. Next at step 401 it is determined whether d is less than the current estimated median value m. If it is then at step 402 the lower counter L is incremented. Otherwise at step 403 it is determined whether d is more than the current estimated median value m. If it is then at step 404 the upper counter H is incremented. Finally, at step 405 if d is equal to the current estimated median value m, then at step 406 the middle counter M is incremented. Next at step 407 the counter updates counter w is incremented. At step 408 it is determined whether w has reached a preset maximum. Until it does the flow loops back to step 400. When the preset maximum is reached w is reset at step 409 and at step 410 it is determined whether the value held by the lower counter L is greater than the sum of the middle counter M and the upper counter H. When this is the case the flow proceeds to step 411, where the estimated median value is decremented and the counter values are adjusted to rebalance the fulcrum, whereby: M⇐L/(m−min); H⇐H+M; and L⇐L−L/(m−min). After a negative outcome at step 410, it is determined at step 412 whether the value held by the upper counter H is greater than the sum of the middle counter M and the lower counter L. When this is the case the flow proceeds to step 413, where the estimated median value is incremented and the counter values are adjusted to rebalance the fulcrum, whereby: M⇐H/(max−m); H⇐H−H/(max−m); and L⇐L+M.

Figure 15:
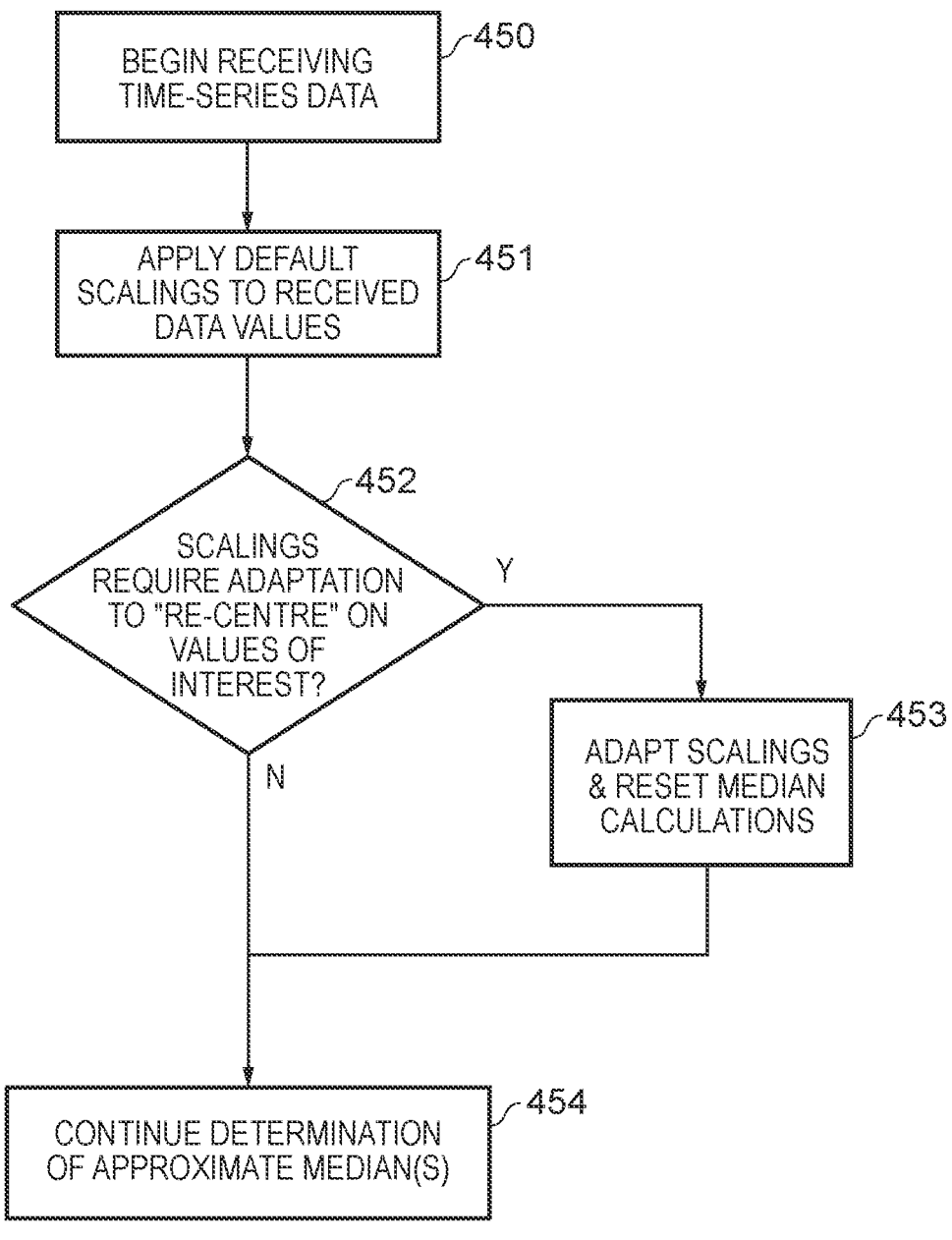
FIG. 15 is a flow diagram showing a sequence of steps which are taken to adapt scalings applied to received data values when performing quantile estimation in accordance with some examples.

FIG. 15 is a flow diagram showing a sequence of steps which are taken to adapt scalings applied to received data values when performing quantile estimation in accordance with some examples. The principle here is that in some circumstances the distribution of data values to be received may only be poorly known (if at all). Further, it will be appreciated that the various techniques presented herein may make use of various assumptions or approximations relating to the data distributions. As such it further proposed herein that, in performing any of the techniques described herein for estimating a quantile, the scalings applied to the data values received may be adapted, once some initial experience of the incoming data has been had. The example set of steps of FIG. 15 begins at step 450, where the reception of time-series data starts. Then, in this initial phase, at 451 a default set of scalings are applied to the received data values. Thereafter, at step 452, it is determined (after a certain amount of data has been received and processed) whether those scalings need adaptation in order to re-centre the focus of the quantile estimation on the values of interest. For example, in the context of the PDF table embodiment this may be determined by a comparison of the relative counts of the counters across the set. If, for example, one of the edge counters (at the index 0 and T−1) is found to have a high count, the scalings may be adjusted to expect a data distribution shifted in that direction. Hence when required, at step 453 the scaling can be adapted and the median (quantile) calculations reset. Thereafter at step 454 the operation of the apparatus continues.

Figure 16:
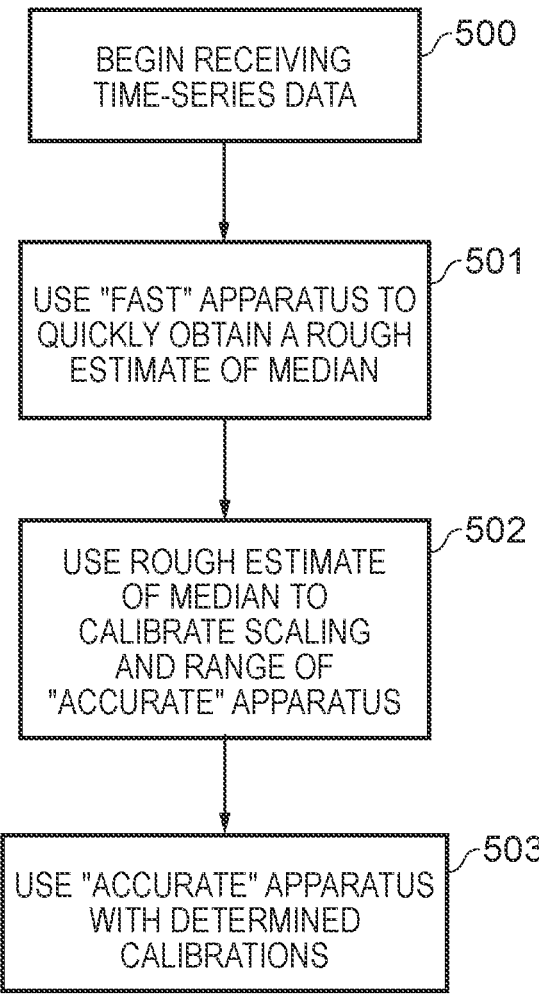
FIG. 16 is a flow diagram showing a two-stage process when performing quantile estimation comprising a first rough determination followed by a second more accurate determination in accordance with some examples.

In another related technique for handling unknown data input, FIG. 16 is a flow diagram showing a two-stage process when performing quantile estimation comprising a first rough determination followed by a second more accurate determination in accordance with some examples. Here two of the apparatuses disclosed herein, which have different speed characteristics, are used in combination with one another. One is faster, but generates less accurate estimates. The other is slower, but produces more accurate estimates. Hence the example of FIG. 16 shows a first step 500 at which the reception of time-series data begins. Then at step 501 initially the "fast" (but less accurate) apparatus is active in order to quickly derive a rough estimate of the quantile (in this example the median). Thereafter (once sufficient data values have been received) at step 502 the rough estimate of the median is used to calibrate the scaling and range of the "accurate" (but slower) apparatus. Thus calibrated the more accurate, slower apparatus takes over at step 503 to provide the ongoing estimate of the median.

Figure 17:
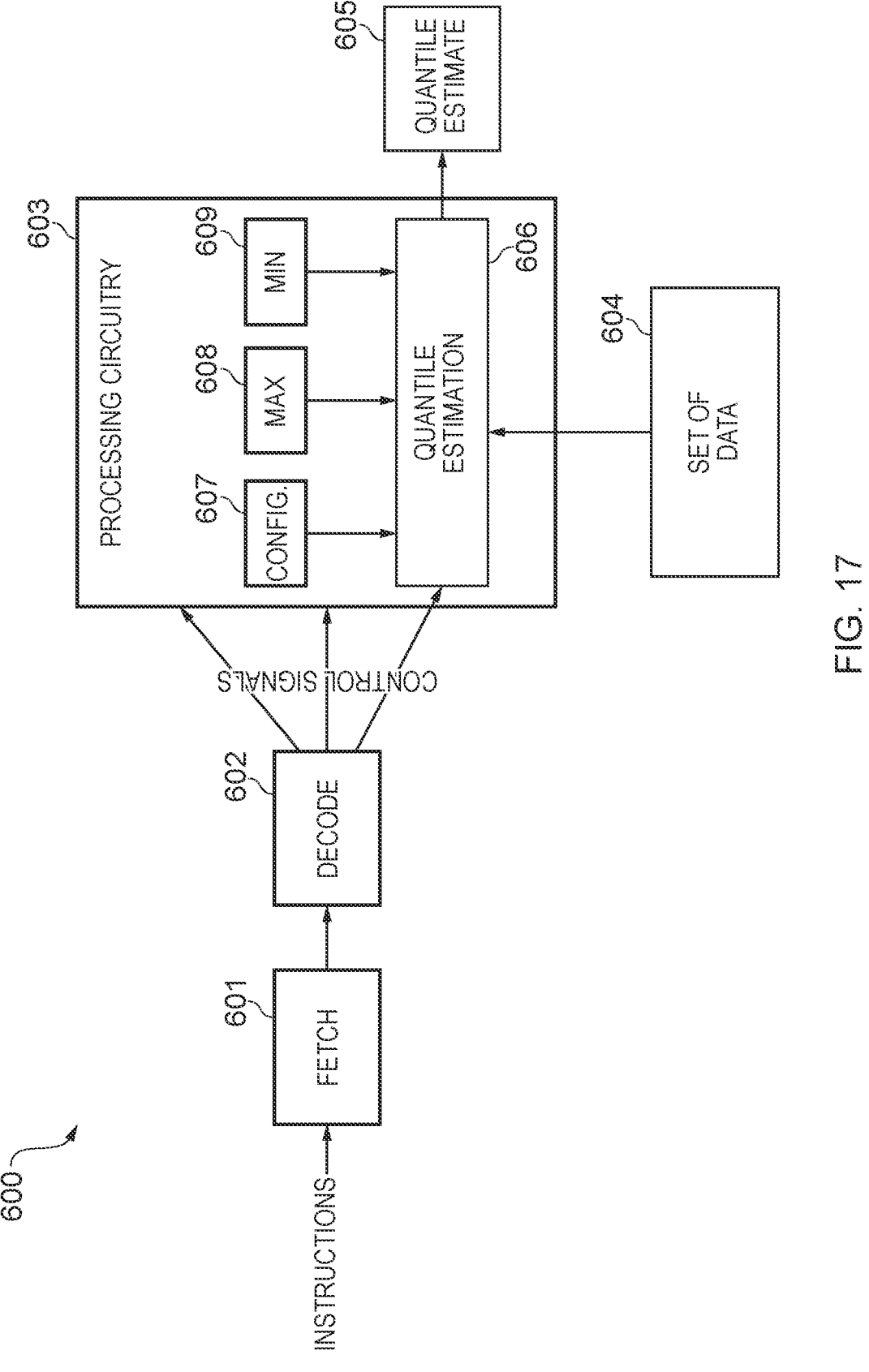
FIG. 17 schematically illustrates an apparatus for performing data processing operations controlled by data processing instructions which comprise a quantile estimation instruction in accordance with some examples.

FIG. 17 schematically illustrates an apparatus for performing data processing operations controlled by data processing instructions which comprise a quantile estimation instruction in accordance with some examples. Accordingly, the present techniques, although generally described above with reference to examples where the data values are received "on-the-fly" (i.e. are not stored in bulk in memory of the apparatus) by dedicated hardware implementation, may also be implemented in more general purpose data processing apparatuses. In support of this, the present techniques further propose that at least one dedicated "quantile estimation" instruction may be incorporated into the instruction set of a data processor, the parameters of which are specifically provided to support these disclosed techniques. Thus FIG. 17 schematically illustrates an apparatus for performing data processing operations controlled by data processing instructions which is configured to be responsive to such a dedicated quantile instruction. The apparatus 600 is shown having a pipelined configuration, where fetch circuitry 601 is arranged to retrieve a sequence of instructions to be executed and to pass these to decoding circuitry 602. The decoding circuitry 602 performs decoding operations on each received instruction, in essence to determine the type of instruction and its associated parameters. The decoding circuitry 602 generates control signals to control the operation of processing circuitry 603 and, when a "quantile estimation" instruction to cause the required quantile estimating operation defined by the instruction to be carried out and generate a quantile estimation 605. The processing circuitry receives the set of data values 604 to be processed—these may be retrieved from memory or could be read from a vector register instead of directly from memory, i.e. one of the source operands of the instruction could be a vector register. As such in the latter case the data are first read from memory into the vector register and then the quantile instruction is invoked. The processing circuitry 603 is shown to comprise quantile estimation processing circuitry 606, supported by registers which define the range over which the quantile is to be calculated (by storing the maximum data value 608 and the minimum data value 609) as well as providing other configuration values 607, such as scaling factors. The configuration of a dedicated "quantile estimation" instruction will vary a little depending on which of the techniques disclosed herein in implemented. For an instruction invoking the PDF or bit vector table technique, the instruction needs to specify 1) a configuration bit (exact or approximate), 2) the exact/approximate MIN and MAX values of the data range (which can also be set by another instruction and written into registers which become input registers), and 3) the quantile register into which to store the quantile value. The scaling factor is required to be defined by the instruction, because it can be derived from the PDF/bit vector table size. Thus such an instruction takes the form:

QUANTILE ConfigBit, DestReg, SourceReg1, SourceReg2
    where:
    ConfigBit: Exact or Approximate;
    DestReg: Destination register to store the quantile value;
    SourceReg1: Source register providing the exact/approximate MIN; and
    SourceReg2: Source register providing the exact/approximate MAX.

In another example implementation, for the fulcrum based approach, the instruction needs to specify the MIN and MAX values, a constant offset and a quantile register. The three counters are not exposed to the instruction. Thus such an instruction takes the form:

QUANTILE DestReg, SourceReg1, SourceReg2, Offset
    where:
    DestReg: Destination register to store the quantile value;
    SourceReg1: Source register providing the approximate MIN
    SourceReg2: Source register providing the approximate MAX
    Offset: A constant offset value to adjust the quantile value
    Note that there is no "ConfigBit" for the fulcrum based approach which is always "approximate". For the hybrid approach of the bit vector table and fulcrum-based methods, the instruction semantics is the same as the fulcrum-based method. Note also that further instructions can also be provided in support of these instruction-based approaches, such as dedicated SETQUANTILE and RESETQUANTILE instructions to initialise all the CPU internal state e.g. scaling factor, min, max etc.

Various example configurations are set out in the following numbered clauses:

Clause 1. Apparatus comprising:
input circuitry arranged to receive a sequence of data values, wherein the data values span a range of values;
a plurality of counters, wherein each counter of the plurality of counters is configured to have a correspondence to a subrange within the range of values;
data counter correspondence circuitry arranged to determine for each data value received by the input circuitry a corresponding counter of the plurality of counters and to apply an update to the corresponding counter of the plurality of counters; and
approximate quantile determination circuitry arranged to generate at least one approximate quantile value for the sequence of data values received in dependence on respective counts of the plurality of counters.

Clause 2. The apparatus as defined in clause 1, wherein the apparatus is configured to operate initially in a data population mode and subsequently in a quantile estimation mode,
wherein the apparatus is configured to switch from the data population mode to the quantile estimation mode in response to count saturation of a threshold number of the plurality of counters.

Clause 3. The apparatus as defined in any preceding clause, further comprising start index tracking circuitry configured to maintain an indication of a lowest subrange non-zero counter of the plurality of counters.

Clause 4. The apparatus as defined in any preceding clause, further comprising:
data value count circuitry configured to count a total number of data values received by the input circuitry;
quantile threshold circuitry configured to generate at least one quantile count threshold value derived from the total number of data values;
quantile index generation circuitry configured to generate at least one index into the plurality of counters corresponding to the at least one quantile count threshold value; and
quantile generation circuitry configured to generate the at least one approximate quantile value in dependence on the at least one index into the plurality of counters.

Clause 5. The apparatus as defined in any preceding clause, wherein the plurality of counters comprises a set of multi-state counters, wherein each counter is configured to indicate one of more than two possible states.

Clause 6. The apparatus as defined in any of clauses 1-4, wherein the plurality of counters comprises a bit vector configured to maintain one of two possible states per counter.

Clause 7. The apparatus as defined in clause 6, further comprising edge index tracking circuitry configured to maintain indications of a lowest subrange non-zero counter of the plurality of counters and of a highest subrange non-zero counter of the plurality of counters.

Clause 8. The apparatus as defined in clause 7, wherein the approximate quantile determination circuitry is configured to generate the at last one approximate quantile value in dependence on a difference between the indication of the lowest subrange non-zero counter and the indication of the highest subrange non-zero counter.

Clause 9. The apparatus as defined in any preceding clause, further comprising data skewedness determination circuitry configured to compare accumulated counts for a first subset of the plurality of counters and a second subset of the plurality of counters, and to determine a skewedness of the sequence of data values by comparison of the first subset and the second subset.

Clause 10. The apparatus as defined in clause 9, comprising:

a first sub-apparatus comprising the plurality of counters, the data counter correspondence circuitry, and the approximate quantile determination circuitry; and a second sub-apparatus comprising a further plurality of counters, further data counter correspondence circuitry, and further approximate quantile determination circuitry, wherein when the skewedness does not meet a skewedness threshold the apparatus is configured to use the first sub-apparatus to generate the at least one approximate quantile value, and when the skewedness meets the skewedness threshold the apparatus is configured to use the second sub-apparatus to generate the at least one approximate quantile value.

Clause 11. The apparatus as defined in any preceding clause, wherein the plurality of counters comprise a set of registers configured to capture a distribution of values, wherein the data counter correspondence circuitry is arranged to perform a scaling and shifting for each data value received by the input circuitry and to apply parallel updates to the set of registers; and wherein the approximate quantile determination circuitry is configured to perform comparisons of accumulated histograms in the set of registers with a pre-defined dataset quantile point and to generate the at least one approximate quantile value for the sequence of data values by a priority encoder selection from the output of the comparisons.

Clause 12. The apparatus as defined in any preceding clause, comprising:

a first sub-apparatus comprising the plurality of counters, the data counter correspondence circuitry, and the approximate quantile determination circuitry; and a second sub-apparatus comprising a further plurality of counters, further data counter correspondence circuitry, and further approximate quantile determination circuitry, wherein the apparatus is configured to operate initially in a data assessment mode and subsequently in a data measurement mode, wherein when in the data assessment mode the apparatus is configured to use the first sub-apparatus to determine an initial estimate of the range of values, and when in the data measurement mode the apparatus is configured to calibrate the second sub-apparatus using the initial estimate of the range of values and to use the second sub-apparatus to generate the at least one approximate quantile value.

Clause 13. The apparatus as defined in any preceding clause, wherein the plurality of counters comprises a lower counter, a middle counter and, an upper counter, wherein the data counter correspondence circuitry arranged:

for data values received by the input circuitry which are less than a provisional median value to apply the update to the lower counter;

for data values received by the input circuitry which are equal to the provisional median value to apply the update to the middle counter; and for data values received by the input circuitry which are greater than the provisional median value to apply the update to the upper counter, and wherein the approximate quantile determination circuitry arranged to generate the at least one approximate quantile value based on the provisional median value, wherein when a defined number of data values has been received by the input circuitry the approximate quantile determination circuitry is arranged to:

decrement the provisional median value when the lower counter exceeds a sum of the middle counter and the upper counter; and increment the provisional median value when the upper counter exceeds a sum of the middle counter and the lower counter.

Clause 14. The apparatus as defined in any preceding clause, further comprising:

instruction decoding circuitry to decode a quantile estimation instruction, wherein the quantile estimation instruction specifies:

a range minimum and a range maximum which define the range of values;

a quantile estimation type which defines a configuration of the plurality of counters; and a destination register into which the at least one approximate quantile value is to be stored, where the instruction decoding circuitry is responsive to decoding the quantile estimation instruction to generate control signals to cause:

the plurality of counters to be configured in accordance with the quantile estimation type;

the data counter correspondence circuitry to determine for each data value received by the input circuitry the corresponding counter of the plurality of counters in dependence on the range minimum and the range maximum; and the approximate quantile determination circuitry to store the at least one approximate quantile value for the sequence of data values received in the destination register.

Clause 15. The apparatus as defined in clause 14, wherein when the quantile estimation type has a first value the control signals are configured to cause the plurality of counters to comprise a set of multi-bit counters and when the quantile estimation type has a second value the control signals are configured to cause the plurality of counters to comprise a bit vector comprising a single bit per counter.

Clause 16. The apparatus as defined in clause 14, wherein the quantile estimation instruction further specifies an offset to be used by the approximate quantile determination circuitry when decrementing or incrementing a provisional median value when generating the at least one approximate quantile value.

Clause 17. A method of operating an approximate quantile determination apparatus comprising:

receiving a sequence of data values, wherein the data values span a range of values;

assigning each counter of a plurality of counters to have a correspondence to a subrange within the range of values;

determining for each data value received by the input circuitry a corresponding counter of the plurality of counters;

applying an update to the corresponding counter of the plurality of counters; and

generating at least one approximate quantile value for the sequence of data values received in dependence on respective counts of the plurality of counters.

In brief overall summary, apparatuses, corresponding methods, and instructions for data processing for the generation of an approximate quantile are provided. A sequence of data values is received, wherein the data values span a range of values and in a plurality of counters each counter is configured to have a correspondence to a subrange within the range of values. For each data value received a corresponding counter of the plurality of counters is determined and an update is applied to the corresponding counter of the plurality of counters. Approximate quantile determination is performed to generate at least one approximate quantile value for the sequence of data values received in dependence on respective counts of the plurality of counters.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:
1. Apparatus comprising:
input circuitry arranged to receive a sequence of data values, wherein the data values span a range of values;
a plurality of counters implemented in hardware, wherein each counter of the plurality of counters is configured to have a correspondence to a subrange within the range of values;
data counter correspondence circuitry arranged to determine for each data value received by the input circuitry a corresponding counter of the plurality of counters and to apply an update to the corresponding counter of the plurality of counters; and
approximate quantile determination circuitry arranged to generate at least one approximate quantile value for the sequence of data values received in dependence on respective counts of the plurality of counters,
wherein the apparatus is configured to operate initially in a data population mode and subsequently in a quantile estimation mode, wherein the apparatus is configured to switch from the data population mode to the quantile estimation mode in response to count saturation of a threshold number of the plurality of counters.
2. The apparatus as claimed in claim 1, further comprising start index tracking circuitry configured to maintain an indication of a lowest subrange non-zero counter of the plurality of counters.

3. The apparatus as claimed in claim 1, further comprising:
data value count circuitry configured to count a total number of data values received by the input circuitry;
quantile threshold circuitry configured to generate at least one quantile count threshold value derived from the total number of data values;
quantile index generation circuitry configured to generate at least one index into the plurality of counters corresponding to the at least one quantile count threshold value; and
quantile generation circuitry configured to generate the at least one approximate quantile value in dependence on the at least one index into the plurality of counters.
4. The apparatus as claimed in claim 1, wherein the plurality of counters comprises a set of multi-state counters, wherein each counter of the set of multi-state counters is configured to indicate one of more than two possible states.
5. The apparatus as claimed in claim 1, wherein the plurality of counters comprises a bit vector configured to maintain one of two possible states per counter.
6. The apparatus as claimed in claim 5, further comprising edge index tracking circuitry configured to maintain indications of a lowest subrange non-zero counter of the plurality of counters and of a highest subrange non-zero counter of the plurality of counters.
7. The apparatus as claimed in claim 6, wherein the approximate quantile determination circuitry is configured to generate the at last one approximate quantile value in dependence on a difference between the indication of the lowest subrange non-zero counter and the indication of the highest subrange non-zero counter.
8. The apparatus as claimed in claim 1, further comprising data skewedness determination circuitry configured to compare accumulated counts for a first subset of the plurality of counters and a second subset of the plurality of counters, and to determine a skewedness of the sequence of data values by comparison of the first subset and the second subset.
9. The apparatus as claimed in claim 8, comprising:
a first sub-apparatus comprising the plurality of counters, the data counter correspondence circuitry, and the approximate quantile determination circuitry; and
a second sub-apparatus comprising a further plurality of counters, further data counter correspondence circuitry, and further approximate quantile determination circuitry,
wherein when the skewedness does not meet a skewedness threshold the apparatus is configured to use the first sub-apparatus to generate the at least one approximate quantile value, and
when the skewedness meets the skewedness threshold the apparatus is configured to use the second sub-apparatus to generate the at least one approximate quantile value.
10. The apparatus as claimed in claim 1,
wherein the plurality of counters comprise a set of registers configured to capture a distribution of values,
wherein the data counter correspondence circuitry is arranged to perform a scaling and shifting for each data value received by the input circuitry and to apply parallel updates to the set of registers; and
wherein the approximate quantile determination circuitry is configured to perform comparisons of accumulated histograms in the set of registers with a pre-defined dataset quantile point and to generate the at least one approximate quantile value for the sequence of data values by a priority encoder selection from an output of the comparisons.

11. The apparatus as claimed in claim 1, comprising:

a first sub-apparatus comprising the plurality of counters, the data counter correspondence circuitry, and the approximate quantile determination circuitry; and a second sub-apparatus comprising a further plurality of counters, further data counter correspondence circuitry, and further approximate quantile determination circuitry, wherein the apparatus is configured to operate initially in a data assessment mode and subsequently in a data measurement mode, wherein when in the data assessment mode the apparatus is configured to use the first sub-apparatus to determine an initial estimate of the range of values, and when in the data measurement mode the apparatus is configured to calibrate the second sub-apparatus using the initial estimate of the range of values and to use the second sub-apparatus to generate the at least one approximate quantile value.

12. The apparatus as claimed in claim 1, wherein the plurality of counters comprises a lower counter, a middle counter and, an upper counter, wherein the data counter correspondence circuitry arranged:

for data values received by the input circuitry which are less than a provisional median value to apply the update to the lower counter;

for data values received by the input circuitry which are equal to the provisional median value to apply the update to the middle counter; and for data values received by the input circuitry which are greater than the provisional median value to apply the update to the upper counter, and wherein the approximate quantile determination circuitry arranged to generate the at least one approximate quantile value based on the provisional median value, wherein when a defined number of data values has been received by the input circuitry the approximate quantile determination circuitry is arranged to:

decrement the provisional median value when the lower counter exceeds a sum of the middle counter and the upper counter; and increment the provisional median value when the upper counter exceeds a sum of the middle counter and the lower counter.

13. The apparatus as claimed in claim 1, further comprising:

instruction decoding circuitry to decode a quantile estimation instruction, wherein the quantile estimation instruction specifies:

a range minimum and a range maximum which define the range of values;

a quantile estimation type which defines a configuration of the plurality of counters; and a destination register into which the at least one approximate quantile value is to be stored, where the instruction decoding circuitry is responsive to decoding the quantile estimation instruction to generate control signals to cause:

the plurality of counters to be configured in accordance with the quantile estimation type;

the data counter correspondence circuitry to determine for each data value received by the input circuitry the corresponding counter of the plurality of counters in dependence on the range minimum and the range maximum; and the approximate quantile determination circuitry to store the at least one approximate quantile value for the sequence of data values received in the destination register.

14. The apparatus as claimed in claim 13, wherein when the quantile estimation type has a first value the control signals are configured to cause the plurality of counters to comprise a set of multi-bit counters and when the quantile estimation type has a second value the control signals are configured to cause the plurality of counters to comprise a bit vector comprising a single bit per counter.

15. The apparatus as claimed in claim 13, wherein the quantile estimation instruction further specifies an offset to be used by the approximate quantile determination circuitry when decrementing or incrementing a provisional median value when generating the at least one approximate quantile value.

16. A method of operating an approximate quantile determination apparatus comprising:

receiving a sequence of data values, wherein the data values span a range of values;

assigning each counter of a plurality of counters implemented in hardware to have a correspondence to a subrange within the range of values;

determining for each data value received by the input circuitry a corresponding counter of the plurality of counters;

applying an update to the corresponding counter of the plurality of counters; and generating at least one approximate quantile value for the sequence of data values received in dependence on respective counts of the plurality of counters;

operating the approximate quantile determination apparatus initially in a data population mode and subsequently in a quantile estimation mode; and switching from the data population mode to the quantile estimation mode in response to count saturation of a threshold number of the plurality of counters.

* * * * *